US008032678B2

(12) United States Patent  
Tardieux et al.

(10) Patent No.: US 8,032,678 B2
(45) Date of Patent: Oct. 4, 2011

(54) SHARED RESOURCE ARBITRATION

(75) Inventors: Jean-Louis Tardieux, Arlington, MA (US); Joern Soerensen, Aars (DK)

(73) Assignee: MediaTek Inc., Hsin-Chu (TW)

( * ) Notice: Subject to any disclaimer, the term of this patent is extended or adjusted under 35 U.S.C. 154(b) by 0 days.

(21) Appl. No.: 12/265,250

(22) Filed: Nov. 5, 2008

(65) Prior Publication Data

US 2010/0115167 A1 May 6, 2010

(51) Int. Cl.
G06F 13/36 (2006.01)
(52) U.S. Cl. ........................................................ 710/113
(58) Field of Classification Search .......... 710/107–125, 710/240–244
See application file for complete search history.

(56) References Cited

U.S. PATENT DOCUMENTS

| | | | |
|---|---|---|---|
| 4,488,218 A | | 12/1984 | Grimes |
| 4,672,536 A * | | 6/1987 | Giroir et al. .................. 710/241 |
| 4,920,486 A | | 4/1990 | Nielsen |
| 5,241,632 A * | | 8/1993 | O'Connell et al. ........... 710/117 |
| 5,560,016 A * | | 9/1996 | Fiebrich et al. ............... 710/240 |
| 5,740,380 A * | | 4/1998 | LaBerge et al. ............... 710/107 |
| 5,832,278 A * | | 11/1998 | Pham ............................ 710/243 |
| 6,035,360 A | | 3/2000 | Doidge et al. ................ 710/107 |
| 6,058,450 A * | | 5/2000 | LaBerge ........................ 710/107 |
| 6,363,445 B1 * | | 3/2002 | Jeddeloh ....................... 710/113 |
| 6,594,718 B1 | | 7/2003 | Ebner et al. .................. 710/240 |
| 6,662,278 B1 * | | 12/2003 | Kahn et al. ................... 711/154 |
| 6,674,306 B1 * | | 1/2004 | Reynolds ....................... 326/94 |
| 6,704,821 B2 * | | 3/2004 | Scandurra et al. ........... 710/243 |
| 6,735,653 B2 * | | 5/2004 | Mathuna et al. .............. 710/105 |
| 6,738,845 B1 | | 5/2004 | Hadwiger et al. |
| 6,895,459 B2 | | 5/2005 | Hadwiger et al. |
| 6,910,088 B2 | | 6/2005 | LaBerge |
| 7,143,219 B1 * | | 11/2006 | Chaudhari et al. ........... 710/111 |
| 7,325,082 B1 * | | 1/2008 | Schibinger et al. .......... 710/111 |
| 7,363,406 B2 * | | 4/2008 | Chai et al. .................... 710/244 |
| 7,577,780 B2 * | | 8/2009 | Huang et al. ................. 710/116 |
| 7,664,901 B2 * | | 2/2010 | Riocreux et al. ............. 710/244 |
| 2005/0060456 A1 * | | 3/2005 | Shrader et al. ............... 710/240 |
| 2008/0215782 A1 | | 9/2008 | Mochida et al. ............. 710/117 |

FOREIGN PATENT DOCUMENTS

EP 1 403 773 3/2004
WO WO 2007/024677 3/2007

OTHER PUBLICATIONS eHow "How to Calculate Computer Bus Bandwidth" TS Jordan Jan. 21, 2010 pp. 1-2.*
TeleCom Dictionary B: Phone Service Definitions. Definition of Bandwidth.*
CPU data Transfer reta [Archive] Feb. 7, 2005 pp. 1-4.*
Communication Partial European Search Report, European Application No. 09174348.4-2212, dated May 6, 2010, 6 pages.
European Search Report, European Application No. EP 09174348.4, dated Jul. 29, 2010, 5 pages.

* cited by examiner

*Primary Examiner* — Paul Myers
(74) *Attorney, Agent, or Firm* — Fish & Richardson P.C.

(57) ABSTRACT

Masters request access to a shared resource, such as a shared bus. Usage of the shared bus by each of the masters is monitored, a request to use the shared bus by one of the masters is received, and usage of the shared bus by the master is compared with a corresponding bandwidth threshold. The request is arbitrated if the usage of the shared bus by the master is below the bandwidth threshold, and the request to use the shared bus is granted to the master based on the arbitration.

61 Claims, 10 Drawing Sheets

SHARED RESOURCE ARBITRATION

BACKGROUND

This description relates to shared resource arbitration.

In some examples, a digital signal processing (DSP) system includes a shared system bus for accessing a shared resource, such as a shared memory device. To prevent contention or conflict when two or more masters compete for usage of the shared bus at the same time, an arbiter arbitrates requests from the masters and grants one of the masters access to the shared bus. The arbiter can use an arbitration policy based on, e.g., a combination of slot priorities and round robin distribution. At each arbitration cycle (or slot), the arbiter grants the master having the highest priority access of the shared bus. Different masters have the highest priority during different arbitration slots. If a particular master needs more bandwidth, the particular master is assigned a higher priority in more arbitration slots. By varying the percentage of arbitration slots in which particular masters have the highest priority, the amount of usages of the shared bus by the particular masters can be adjusted.

SUMMARY

Requests from masters for use of a shared resource are arbitrated using an arbitration scheme that uses information gathered by monitoring usage of the shared resource by the masters. In some examples, the shared resource is a shared bus that can be used to access a shared device. The arbitration scheme provides bandwidth control and latency control. A soft mode operation is provided in which masters whose bandwidth usage exceeds allocated limits may nonetheless access the shared bus if no other master having a higher priority is accessing the bus.

In general, in one aspect, usage of a shared bus by each of a plurality of masters is monitored; a request to use the shared bus by one of the masters is received; usage of the shared bus by the master is compared with a bandwidth threshold; the request is arbitrated if the usage of the shared bus by the master is below the bandwidth threshold; and the request to use the shared bus is granted to the master based on the arbitration.

Implementations may include one or more of the following features. The shared bus is used to access a memory device or a peripheral device (e.g., a hardware accelerator). The usages of the shared bus by the masters is monitored continuously, and at each arbitration cycle, zero or more requests for usage of the shared bus is received from zero or more of the masters. The usage of the shared bus by the masters sending the requests is determined, and the requests whose corresponding masters have usages below corresponding bandwidth thresholds are arbitrated. The usage of the shared bus by each master is monitored based on the number of times the master is granted access to the shared bus within a time window. An average grant value representing the number of times each master is granted access to the shared bus per clock cycle within the time window is determined.

In some examples, determining the average grant value includes determining a difference between a first grant value indicating whether the master is granted access to the shared bus at a most recent clock cycle, and a second grant value indicating whether the master is granted access to the shared bus in an earliest clock cycle within the time window. In some examples, the average grant value is determined based on a grant value indicating whether the master is granted access to the shared bus at a most recent clock cycle, and a previous average grant value representing the average number of times the master is granted access to the shared bus per clock cycle within the time window prior to the most recent clock cycle. In some examples, the average grant value is determined based on a grant sub-count representing the number of times the master is granted access to the shared bus within a most recent sub-window period, and a previous average grant value representing the average number of times the master is granted access to the shared bus per clock cycle within the time window prior to the most recent sub-window period, each sub-window period including two or more clock cycles. The time window includes a moving time window having a fixed length of time.

In some examples, for each clock cycle within the time window and for each master, a grant value indicating whether the corresponding master is granted access to the shared bus at the corresponding clock cycle is stored in memory. In some examples, for each sub-window periods within the time window and for each master, a grant sub-count representing a number of times the corresponding master is granted access to the shared bus during the corresponding sub-window period is stored in memory, each sub-window period including two or more clock cycles. In some examples, requests from masters whose wait times are above corresponding latency thresholds are arbitrated separately from arbitration of requests from masters whose usage of the shared bus are below corresponding bandwidth thresholds, and one of the masters is granted use of the shared bus based on the two arbitrations. In some examples, requests from masters whose wait times are above corresponding latency thresholds are assigned a higher priority than requests from masters whose wait times are below or equal to corresponding latency thresholds. In some examples, requests from all masters are arbitrated regardless of the usages of the shared bus separately from arbitration of requests from masters whose usage of the shared bus are below corresponding bandwidth thresholds, and one of the masters is granted use of the shared bus based on both arbitrations. In some examples, requests from masters whose usage of the shared bus are below corresponding bandwidth thresholds are assigned a higher priority than masters whose usage of the shared bus are above or equal to corresponding bandwidth thresholds.

In some examples, at least two masters have different bandwidth thresholds. In some examples, the masters have the same bandwidth threshold. Each bandwidth threshold represents a percentage of the bus bandwidth that is allocated to a corresponding master. In some examples, the first arbiter has a plurality of sub-arbiters, and one of the sub-arbiters is selected to arbitrate the request. Each sub-arbiter corresponds to a range of bus bandwidth usage levels such that requests from masters having bus bandwidth usage levels within a same range are arbitrated by a same sub-arbiter, and requests from masters having different ranges of bus bandwidth usage levels are arbitrated by different sub-arbiters. A higher priority is assigned to a first request granted by a first sub-arbiter than a second request granted by a second sub-arbiter, in which the first sub-arbiter corresponds to a lower range of bus bandwidth usage levels than the second sub-arbiter.

In general, in another aspect, usage of a shared bus by each of a plurality of masters is monitored; requests to use the shared bus are received from at least some of the masters; normal weights are assigned to requests to use the shared bus from masters whose usage of the shared bus are below corresponding bandwidth thresholds; low weights are assigned to requests to use the shared bus from masters whose usage of the shared bus are above or equal to corresponding bandwidth thresholds; the requests to use the shared bus are arbitrated based on an arbitration policy, taking into account the weights of the requests, and one of the masters is granted use of the shared bus based on the arbitration.

Implementations may include one or more of the following features. Wait times for usage of the shared bus by the masters are monitored, and high weights are assigned to requests to use the shared bus from masters whose wait times are above a wait threshold. Assigning normal weights includes assigning a plurality of normal weights according to an inverse relationship to the bus usage bandwidth by the masters, in which higher normal weights are given to requests from masters having a lower bus usage bandwidth. An option for disabling the assignment of low weights to requests from masters whose usage of the shared bus are above or equal to corresponding bandwidth thresholds are provided so that the requests from masters whose usages of the shared bus are above or equal to corresponding bandwidth thresholds are not eligible for arbitration.

In general, in another aspect, requests from a plurality of masters for use of a shared bus are arbitrated; and bandwidth of usage of the shared bus by the masters are controlled based on feedback information indicating usage of the shared bus by each master in which requests from masters whose usages of the shared bus are above or equal to corresponding thresholds are filtered out prior to arbitration.

Implementations may include one or more of the following features. Latency for usage of the shared bus are controlled by separately arbitrating requests from masters whose wait times are above corresponding latency thresholds, and merging grants from the two arbitrations. Latency for usage of the shared bus is improved by using a plurality of arbiters to arbitrate requests from masters whose usages of the shared bus are below corresponding thresholds, each arbiter corresponding to a range of bus bandwidth usage levels such that requests from masters having a same range of bus bandwidth usage levels are arbitrated by a same arbiter, and requests from masters having different ranges of bus bandwidth usage levels are arbitrated by different arbiters. Usage of the shared bus is increased by separately arbitrating requests from all masters regardless of usages of the shared bus, and merging grants from the two arbitrations.

In general, in another aspect, a filter filters requests from masters requesting access to a shared bus, the filter passing requests from masters whose usages of the shared bus are below corresponding bandwidth thresholds; and a first arbiter arbitrates requests that pass the filter.

Implementations may include one or more of the following features. A memory device is accessed by the masters through the shared bus. Each of the masters includes a software application or a hardware device. The filter includes a moving average filter that filters the requests from the masters based on a number of times that each master is granted access to the shared bus within a moving time window. In some examples, a memory stores, for each master and for each clock cycle, a grant value indicating whether the corresponding master is granted access to the shared bus during the corresponding clock cycle. At each clock cycle and for each master, the moving average filter determines a difference between the grant value for the most recent clock cycle, and the grant value for the earliest clock cycle stored in the memory. In some examples, a memory stores, for each master and for each sub-window within the time window, a grant sub-count indicating a number of times the corresponding master is granted access to the shared bus for the corresponding sub-window, each sub-window including two or more clock cycles. At each clock cycle and for each master, the moving average filter determines a difference between the grant sub-count for the most recent sub-window and the grant sub-count for the earliest sub-window stored in the memory.

In some examples, the filter determines, for each master, an average grant value representing the average number of times the master is granted access to the shared bus per clock cycle within the time window. The filter determines the average grant value based on a grant value indicating whether the master is granted access to the shared bus at a most recent clock cycle and a previous average grant value representing the average number of times the master is granted access to the shared bus per clock cycle within the time window prior to the most recent clock cycle. In some examples, the filter includes a first storage storing a grant sub-count indicating a number of times the master is granted access to the shared bus during a most recent sub-window period, and a second storage storing a previous average grant value indicating an average number of times the master is granted access to the shared bus per clock cycle within the time window prior to the most recent sub-window period, each sub-window period including two or more clock cycles. The filter determines the average grant value based on the grant sub-count and the previous average grant value.

In some examples, a second arbiter arbitrates requests from masters whose wait times are above corresponding latency thresholds. A merge unit merges the requests granted by the first and second arbiters, in which a higher priority is given to the request granted by the second arbiter than the request granted by the first arbiter. In some examples, a second arbiter arbitrates requests from all of the masters regardless of the usages of the shared bus. A merge unit merges the requests granted by the first and second arbiters, in which a higher priority is given to the request granted by the first arbiter than the request granted by the second arbiter. The first arbiter includes a plurality of sub-arbiters, each sub-arbiter corresponding to a range of bus usage levels, each sub-arbiter arbitrating requests from masters whose bus usage levels fall within the range of bus usage levels corresponding to the sub-arbiter. Requests granted by a first sub-arbiter is given a higher priority than requests granted by a second sub-arbiter, in which the first sub-arbiter corresponds to a lower range of bus bandwidth usage levels than the second sub-arbiter.

In general, in another aspect, a first filter filters requests from masters requesting access to a shared bus, the first filter assigning normal weights to requests from masters whose usages of the shared bus are below corresponding bandwidth thresholds; a second filter filters requests from the masters requesting access to the shared bus, the second filter assigning low weights to requests from masters whose usages of the shared bus are above or equal to corresponding bandwidth thresholds; and an arbiter arbitrates the requests using an arbitration policy, taking into account the weights of the requests, and grants one of the masters to access the shared bus.

Implementations may include one or more of the following features. A third filter filters requests from the masters requesting access to the shared bus, the third filter assigning high weights to requests from masters whose wait times are above a wait threshold. The first filter assigns a plurality of normal weights according to an inverse relationship to the bus usage bandwidth by the masters, in which higher normal weights are given to requests from masters having a lower bus usage bandwidth. A switch can be used to disable the second filter so that the requests from masters whose usages of the shared bus are above or equal to corresponding bandwidth thresholds are not eligible for arbitration.

In general, in another aspect, a plurality of masters each includes a software application or a hardware device; a filter filters requests from the masters requesting access to a shared resource, the filter passing only requests from masters whose usages of the shared resource are below corresponding bandwidth thresholds; a first arbiter arbitrates requests that pass the filter; a second arbiter arbitrates requests from masters whose wait times are above corresponding latency thresholds; a third arbiter arbitrates requests from the masters regardless of usages of the shared bus and wait times; and a merge unit merges the requests granted by the first, second, and third arbiters.

Implementations may include one or more of the following features. A normal priority is given to the request granted by the first arbiter, a high priority is given to the request granted by the second arbiter, and a low priority is given to the request granted by the third arbiter. The shared resource includes a memory device or a peripheral device (e.g., a hardware accelerator). The filter monitors, for each master, a number of times or an average number of times the master is granted access to the shared resource. The first arbiter includes a plurality of sub-arbiters, each sub-arbiter corresponding to a range of bus usage levels, each sub-arbiter arbitrating requests from masters whose bus usage levels fall within the range of bus usage levels corresponding to the sub-arbiter, requests granted by a sub-arbiter corresponding to a lower range of bus bandwidth usage levels is given a higher priority than requests granted by another sub-arbiter corresponding to a higher range of bus bandwidth usage levels.

These and other aspects and features, and combinations of them, may be expressed as methods, apparatus, systems, means for performing functions, program products, and in other ways.

Advantages of the aspects, systems, and methods may include one or more of the following. Usage of a shared resource (e.g., a shared bus) by masters can be controlled more accurately, wait times for use of the shared resource can be reduced, and utilization of the shared resource can be increased. Accurate control of bandwidth usage allows applications that are developed independently by different developers to be integrated properly. Use of a simple moving average filter allows bandwidth of usage of a shared resource by a master to be easily monitored. Use of sub-windows in a history window reduces the amount of memory needed for monitoring usage of the shared resource by the master, and reduces power consumption by lowering a clock speed of the filter. Use of an exponentially weighted moving average filter further reduces memory requirements for monitoring usage of the shared resource by the master.

DETAILED DESCRIPTION

Bandwidth Control

Figure 1A:
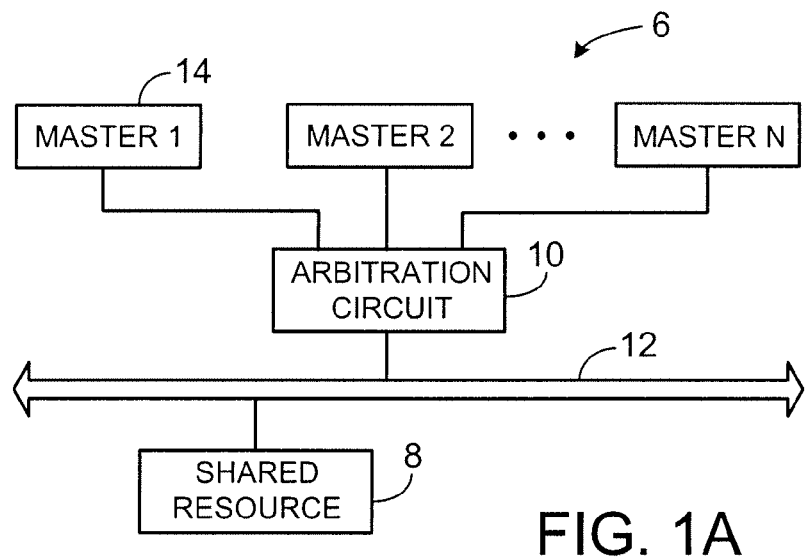
FIG. 1A is a diagram of a system having bandwidth controlled arbitration.

Referring to FIG. 1A, a system 6 includes masters 14 that access a shared resource 8 through a shared bus 12. To prevent conflict or contention among the masters 14, an arbitration circuit 10 arbitrates requests from the masters 14 to determine which master 14 can access the shared resource 8 at a given time. For example, the masters 14 can be hardware devices (e.g., data processors, processor cores of a multi-core processor, signal processors, direct memory access controllers, chipsets, and/or microcontrollers) or software applications (e.g., signal encoding/decoding applications, media players, and/or video conferencing applications). The shared resource 8 can be, for example, a memory device or a peripheral device (e.g., a hardware accelerator). As described below, the arbitration circuit 10 has features to enable accurate bandwidth control, reduce wait times, and enhance utilization of the shared resource 8.

Figure 1B:
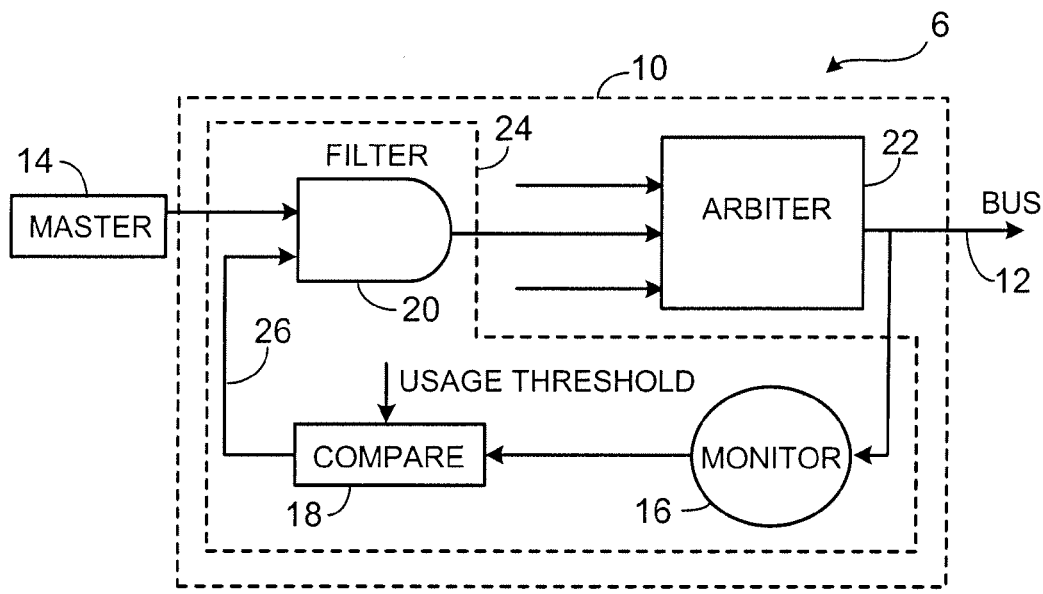
FIGS. 1B and 1C are diagrams of arbitration circuits.

Referring to FIG. 1B, the arbitration circuit 10 includes an arbiter 22 for arbitrating requests from the masters 14 (only one master is shown in the figure) for usage of the shared bus 12. A priority filter 24 filters the requests based on the amount of usage of the shared bus 12 by the corresponding masters 14 within a moving time window. If a master's usage of the shared bus 12 in the time window is above a usage threshold, requests from the master are not sent to the arbiter 22. As time passes, when the master's usage of the shared bus 12 during the moving time window drops below the usage threshold, requests from the master are allowed to pass the filter 24 and arbitrated along with requests from other masters whose usage of the shared bus 12 are below corresponding usage thresholds. By monitoring usage of the shared bus 12 by the masters 14 and arbitrating requests from the masters 14 that have not exceeded their usage thresholds, the usage of the shared bus 12 by the masters 14 can be controlled more accurately.

Usage of the shared bus 12 can be expressed in terms of bandwidths, such as absolute bandwidth (e.g., 100 MHz) or a percentage of the total bus bandwidth. Controlling usage of the shared bus 12 by the masters 14 will be referred to as controlling bandwidths of the masters 14. Thus, when we say "the bandwidth of a master 14," we mean the bandwidth of the shared bus 12 used by the master 14. When we say the master 14 has a bandwidth threshold of 50%, it means that usage of the shared bus 12 by the master 14 should not exceed 50% of the total bandwidth of the shared bus 12.

In this description, the term "bandwidth" can have various definitions depending on the implementation of the system 6. For example, in some implementations, the bandwidth of a master may refer to the amount of time a master is granted access to a given interface, in which time can be measured as clock cycles. In some implementations, the bandwidth of a master may refer to the number of bytes transferred over an interface within a given time unit. In some implementations, when a master is granted access to an interface, the bandwidth of the master may refer to the number of clock cycles that data are actually transmitted over the interface. For any given implementation, the same or different definition of bandwidth applies to all masters and the arbitration circuit 10 accurately controls the bandwidths of masters accordingly.

Controlling the bandwidths of the masters 14 is useful because each master 14 may need to use a certain amount of bus bandwidth in order to function properly. In some examples, by properly assigning bandwidth thresholds to various masters 14 and controlling the usages of each master 14 not to exceed the corresponding bandwidth threshold, all of the masters 14 can have their allocated bus bandwidths. This is useful for integrating applications that are developed independently by different developers. If each developer designs its application to work within a specified bandwidth, it is more likely that the applications will function properly when integrated into the system 6.

For example, the system 10 can be a mobile phone, and some of the masters can be software applications such as modem protocol stack, application operating system, and audio or video codecs (coder/decoders) that are independently developed by different companies. When the various software applications are installed in the mobile phone, the mobile phone operating system has to carefully control the usage of the shared bus 12 by the software applications so that each application has enough bandwidth to function properly. Using the feedback information that indicate the actual usages of the shared bus 12 by the masters 14, the mobile phone 10 can control the bandwidth of each master 14 more accurately to ensure that all applications function properly.

The priority filter 24 includes monitor units 16 (only one monitor unit is shown in the figure) that continuously monitor the bandwidths of the masters 14 within a moving window of time, also referred to as a history window. In some examples, the masters 14, the arbiter 22, the priority filter 24, and the shared bus 12 are synchronized to a clock signal, and the monitor unit 16 estimates the bandwidth of a master 14 by counting the number of clock cycles within the history window that the bus 12 is granted to the master 14. For example, if a master 14 is granted use of the shared bus 12 by the arbiter 22 for forty clock cycles in a history window of 512 clock cycles, the bandwidth of the master 14 is estimated to be 40/512*100%=7.8% of the bus bandwidth.

A compare unit 18 compares the measured bus usage as determined by the monitor unit 12 with a usage threshold (e.g., bandwidth threshold), and outputs a signal 26 to a filter 20 that controls whether a request from a corresponding master 14 can be passed to the arbiter 22 for arbitration. In the example of FIG. 1B, the filter 20 is an AND gate, and the signal 26 is logic 1 (or 0) when the bandwidth of the mater 14 is below (or above or equal to) a corresponding bandwidth threshold. When the signal 26 is logic 1, a request from the master 14 passes the filter 20 and is sent to the arbiter 22. When the signal 26 is logic 0, the request from the master 14 is blocked by the filter 20 and not sent to the arbiter 22. The arbiter 22 arbitrates the requests that pass the filter 20 and grants the shared bus 12 to one of the masters 14 based on the arbitration.

By measuring the bandwidth of the master 14 according to the number of clock cycles that the shared bus 12 is used by each master 14, and arbitrating requests from masters 14 who have not exceeded their bandwidth thresholds, accurate bandwidth control can be achieved. This is useful in a system with predominantly packet based transactions and with very different access profiles among the various masters.

By comparison, in an example conventional system, the bandwidth of masters may be controlled based on arbitration slots, so if a master is granted access to the shared bus x % of the arbitration slots, the system may determine the master has a bandwidth of x %. However, because different operations may take up different numbers of clock cycles, monitoring the bandwidth based on arbitration slots may result in inaccurate measurement of the actual bus usage. For example, a first master may issue requests that take more than 20 clock cycles to complete, and a second master may issue requests that take less than 3 clock cycles to complete. If the first master is granted bus access 40% of the arbitration slots, and the second master is granted bus access 60% of the time, the system may incorrectly determine that the second masters has a higher bus usage than the first master, when in fact the first master uses a larger share of the bus bandwidth.

Figure 1C:
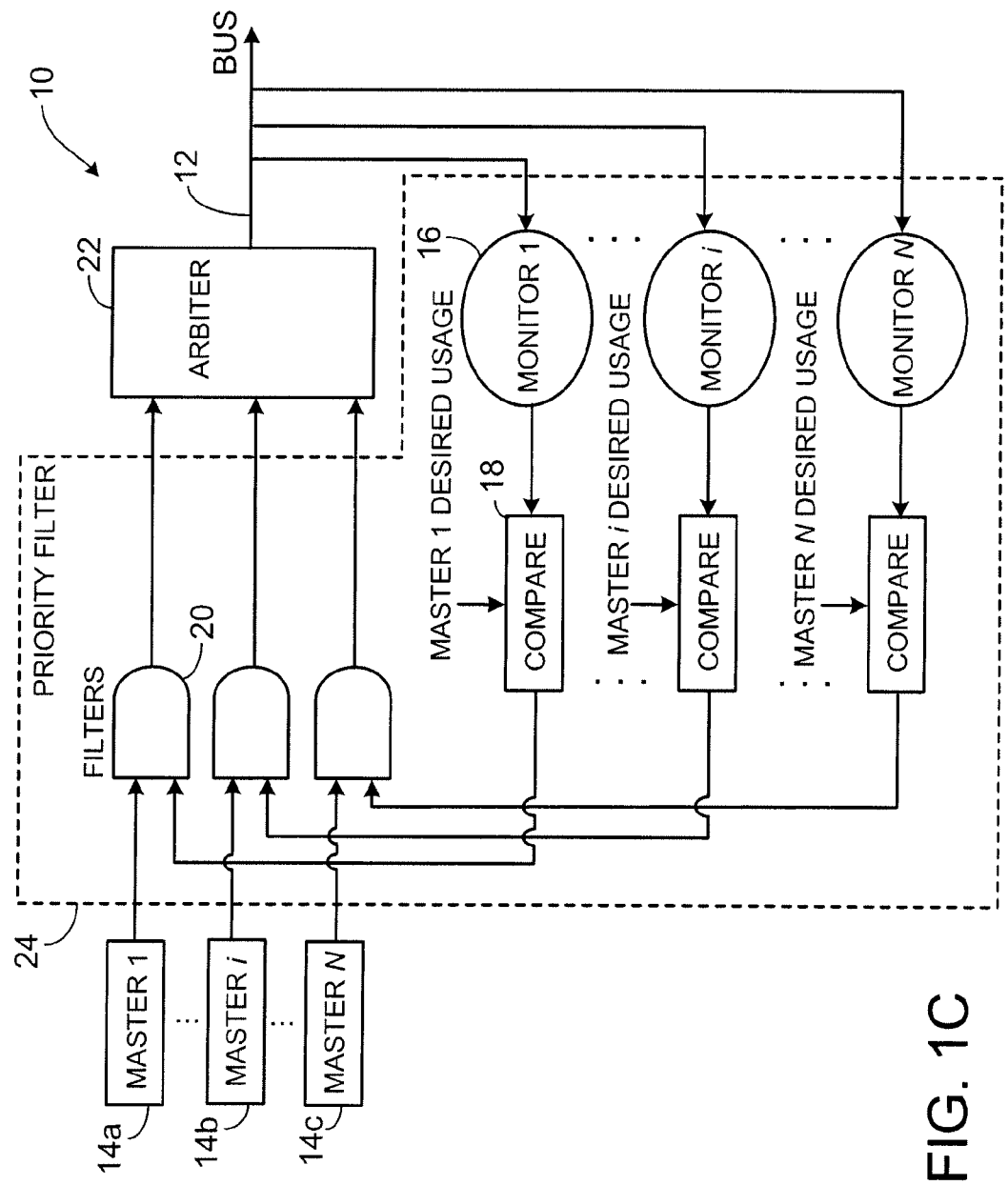

FIG. 1C is a diagram of an arbitration circuit 10 having a priority filter 24 that filters requests from N masters 14. The priority filter 24 monitors the usage of the shared bus 12 by the masters 14, and allows only requests from masters whose bus usages are below corresponding bandwidth thresholds to pass to the arbiter 22. For each master 14 there is a corresponding monitor unit 16, compare unit 18, and filter 20 that operate in a manner similar to those in the example of FIG. 1B.

Each master 14 may be allocated a certain amount of usage of the shared bus 12. For example, masters 14a, 14b, and 14c may be allocated 50%, 30%, and 20%, respectively, of the bandwidth of the shared bus 12. When the amount of usage of the shared bus 12 by each master 14 is accurately controlled, each master 14 can operate as intended and use the allocated bandwidth.

Figure 2:
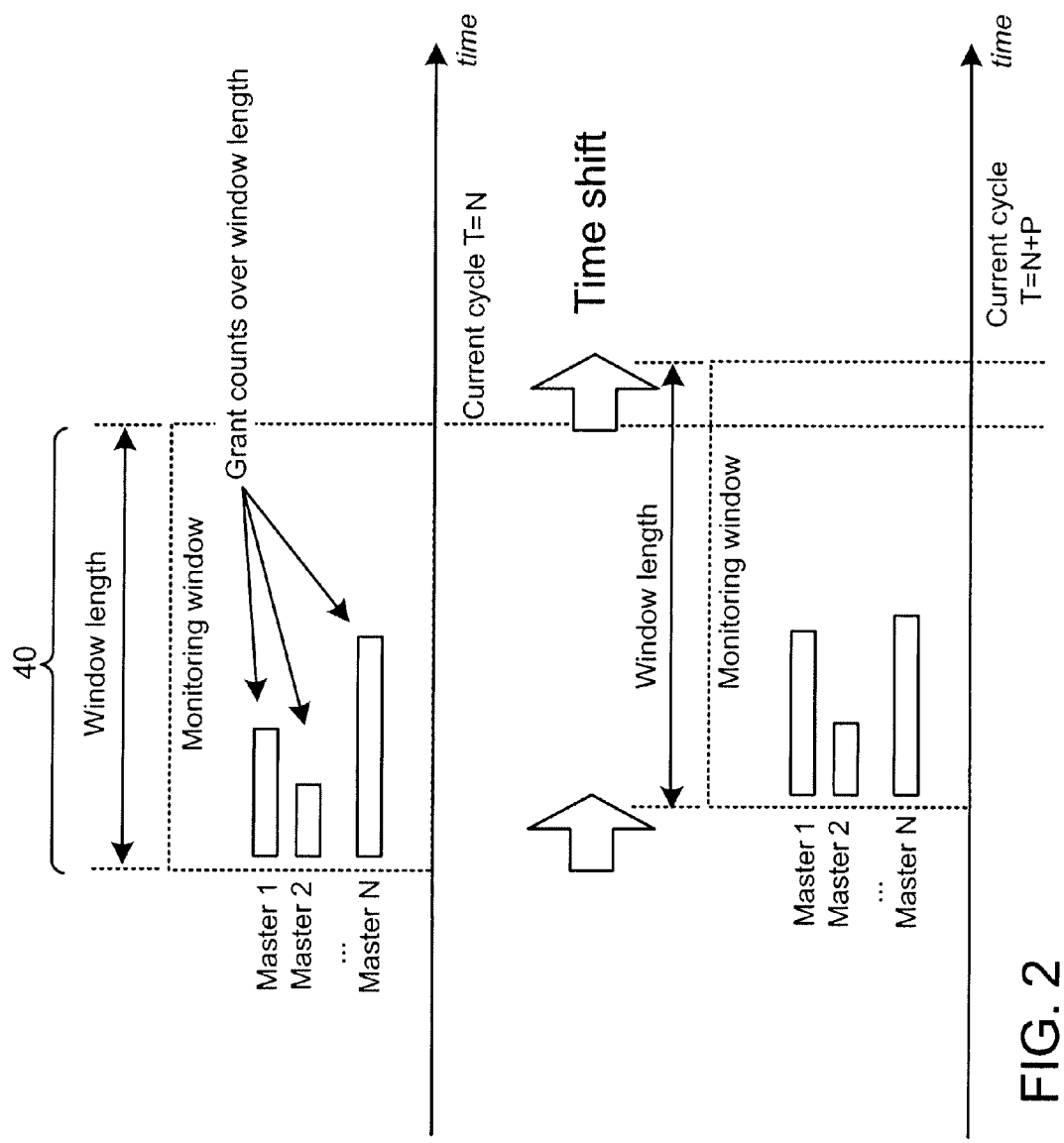
FIG. 2 is a diagram showing moving history windows.

FIG. 2 shows a moving monitoring window (or history window) 40 that has a constant window length. During an arbitration cycle T=N, the number of clock cycles in which the shared bus 12 is granted to each master 14 within the history window 40 is counted. The count values represent the amount of usage of the shared bus 14 by the corresponding masters 14. During the next arbitration cycle T=N+1, the history window 40 is shifted in time to the next arbitration cycle, and the number of clock cycles for which the shared bus 12 is granted to each master 16 within the history window 40 is updated.

In some implementations, a first order moving average digital filter is used to monitor usage of the shared bus 14. Two variations of the filter are described below.

Simple Moving Average Filter

The following is a description of a simple moving average filter. The bus grant average over a period of N cycles is computed as:

$$\overline{X}(k) = \frac{1}{N} \sum_{k-N+1}^{k} X(i) \qquad \text{(Equ. 1)}$$

where $X(i)$ is the grant value at time $(i)$

In some examples, a grant value of 1 (or 0) means that the master was granted (or not granted) access to the shared bus 14. In some examples, the time i refers to clock cycle i. The bus grant average is a number in a range from 0 to 1. For example, a bus grant average of 0.5 means that the master was granted access to the shared bus 14 in about 50% of the clock cycles.

The grant values X(i) can be stored in memory having N entries (for storing a history window of length N, or N clock cycles). As the history window moves in time, the memory is updated by storing the latest grant value (e.g., via a push operation) and removing the earliest grant value (e.g., via a pop operation) in the history window. Equation 1 above can be rewritten in the form below to illustrate the memory push/pop mechanism:

$$\overline{X}(k) = \overline{X}(k-1) + \frac{1}{N}(X(k) - X(k-N)) \qquad \text{(Equ. 2)}$$

In Equation 2, X(k) corresponds to pushing a grant value for clock cycle k to memory, and −X(k−N) corresponds to popping a grant value for clock cycle k−N from memory. Equation 2 above shows a dependency of the grant average at time k with the grant value at time k−N, which means that a memory of size N is required to implement the calculations in Equation 2. If there are M arbiters, a memory having a size M×N is required to store the M history windows, each having N grant values.

To support a history window covering a large number N of clock cycles while reducing the memory size, a sub-window can be defined and used as the filter moving increment. Each entry in the memory represents the number of clock cycles that a master is granted access during a sub-window.

For example, suppose the history window has a length of 128 clock cycles, and a sub-window having a length of 4 clock cycles is used, then each entry in the memory represents the number of clock cycles during the 4 clock-cycle sub-window that the master is granted access to the shared bus 12 (referred to as "grant clock cycles"). This way, instead of using a memory of size 128 to store 128 values of 1 or 0 (representing grant or non-grant during each clock cycle), a memory of size 32 can be used to store 32 values each ranging from 0 to 4 (representing the number of grant clock cycles during each 4 arbitration-cycle sub-window). In some examples, the length of the sub-window is smaller than N/16 to reduce the effect of the sub-window on the total average.

When sub-windows are used, the Equation 2 above remains unchanged, except that X(k) represents the number of grant clock cycles over a sub-window period, and $\overline{X(k)}$ represents the average number of grant clock cycles over a sub-window period.

As another example, suppose a system 6 has eight competing masters 14 and uses a history window having a length N=512 clock cycles and a sub-window having a length of 16 clock cycles (which means there are 32 sub-windows). A master grant sub-counter generates count values each having 5 bits to represent count values from 0 to 16. A memory having a size 8×5=40 bits is used to store the eight 5-bit count values for the 8 masters 14 for each sub-window. A history window memory having a size 32×40=1280 bits is used to store the count values of the 8 masters 14 for the 32 sub-windows. If sub-windows were not used, a memory having a size of 8×512=4096 bits would be needed. Thus, using the sub-windows results in considerable reductions in memory size and cost. By use of the sub-window time increments, the frequency at which the main window subtraction and memory pop operations are performed can be reduced, resulting in reduction of power consumption.

Figure 3:
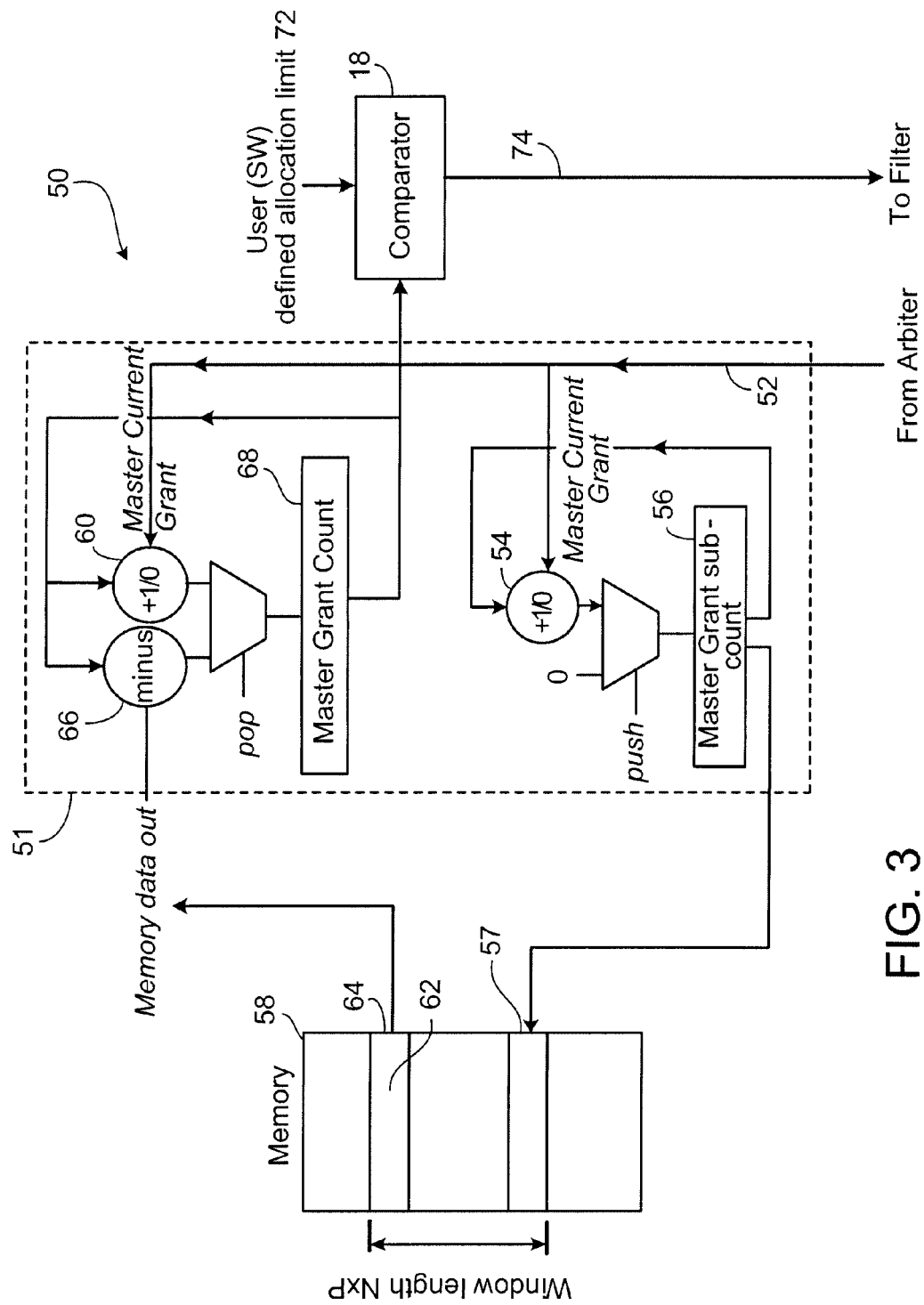
FIG. 3 is a diagram of a circuit for implementing a simple moving average filter.

FIG. 3 is a diagram of a circuit 50 that can implement a simple moving average filter. A logic unit 51 includes mechanisms for updating a master grant count and a master grant sub-count based on information from the arbiter 22 indicating whether a master is granted access to the shared bus 12 during each clock cycle. The arbiter 22 sends a signal 52 to control an adder 54 to add a 1 or 0 grant value (representing grant or non-grant, respectively) to a master grant sub-count 56, which represents the number of grants in the most recent sub-window. During each sub-window, the master grant sub-count 56 continues to add 1 or 0 at each clock cycle, but only stores the master grant sub-count 56 to a memory 58 once after the end of the last clock cycle in the sub-window via a push operation. The push operation pushes the master grant sub-count 56 in an entry 57 of the memory 58 representing the most recent sub-window.

The signal 52 also controls an adder 60 to add a 1 or 0 grant value to a master grant count 68 that represents the total number of grant clock cycles within the history window 40. After the end of a sub-window, a pop operation pops a master grant sub-count 62 from an entry 64 of the memory 58 representing the earliest sub-window in the history window 40. The master grant sub-count 62 is subtracted 66 from the master grant count 68, which is compared (using comparator 18) with a software defined allocation limit 72. The results 74 of the comparison is sent to the filter 20.

The logic unit 51 can be part of a monitor unit 16 in FIG. 1B. The logic unit 51 updates the master grant count 68 and the master grant sub-count 56 for one master 14. If the system includes N masters, as shown in FIG. 1C, then N logic units 51 can be used to update the master grant counts and the master grant sub-counts for the N masters.

Exponentially Weighted Moving Average Filter

In some implementations, an exponentially weighted moving average filter is used. Equation 2 can be rewritten by adding one more sample to the history window, so that $$\overline{X}(k) = \frac{1}{N} \sum_{k-N+1}^{k} X(i) \quad \text{(Equ. 3)}$$

becomes $$\overline{X}(k+1) = \frac{1}{N+1} \sum_{k-N+1}^{k+1} X(i),$$

and $$\overline{X}(k+1) = \frac{1}{N+1} \left( \sum_{k-N+1}^{k} X(i) + X(k+1) \right) \quad \text{(Equ. 4)}$$

becomes $$\overline{X}(k+1) = \frac{1}{N+1}(N \times \overline{X(k)} + X(k+1)).$$

If we define $\alpha = \frac{1}{N+1}$, we obtain:

$$\overline{X}(k) = (1-\alpha) \cdot \overline{X}(k-1) + \alpha \cdot X(k) \quad \text{(Equ. 5)}$$

In this form, the bus grant average now depends on the previous average and the current bus grant, which means that no memory other than the counter itself is required. To reduce the complexity of the operations that need to be performed, N is chosen such that $$\alpha = \frac{1}{2^P}.$$

Equation 5 can be rewritten as:

$$\overline{X}(k) = \overline{X}(k-1) + ((X(k) - \overline{X}(k-1)) >> P), \quad \text{(Equ. 6)}$$

where ">>" denotes a logical shift operation.

A variation of the above equation can be formulated introducing a sub-window counter (of length $\beta = 2^Q$):

$$\overline{X}(k+\beta) = \overline{X}(k) + ((\text{SubCount}(k+\beta) >> P) - (\overline{X}(k) >> (P-Q))) \quad \text{(Equ. 7)}$$

Some rounding errors may be introduced due to the shift operation, but the rounding errors can be reduced by using more bits to encode $\overline{X}$.

Figure 4:
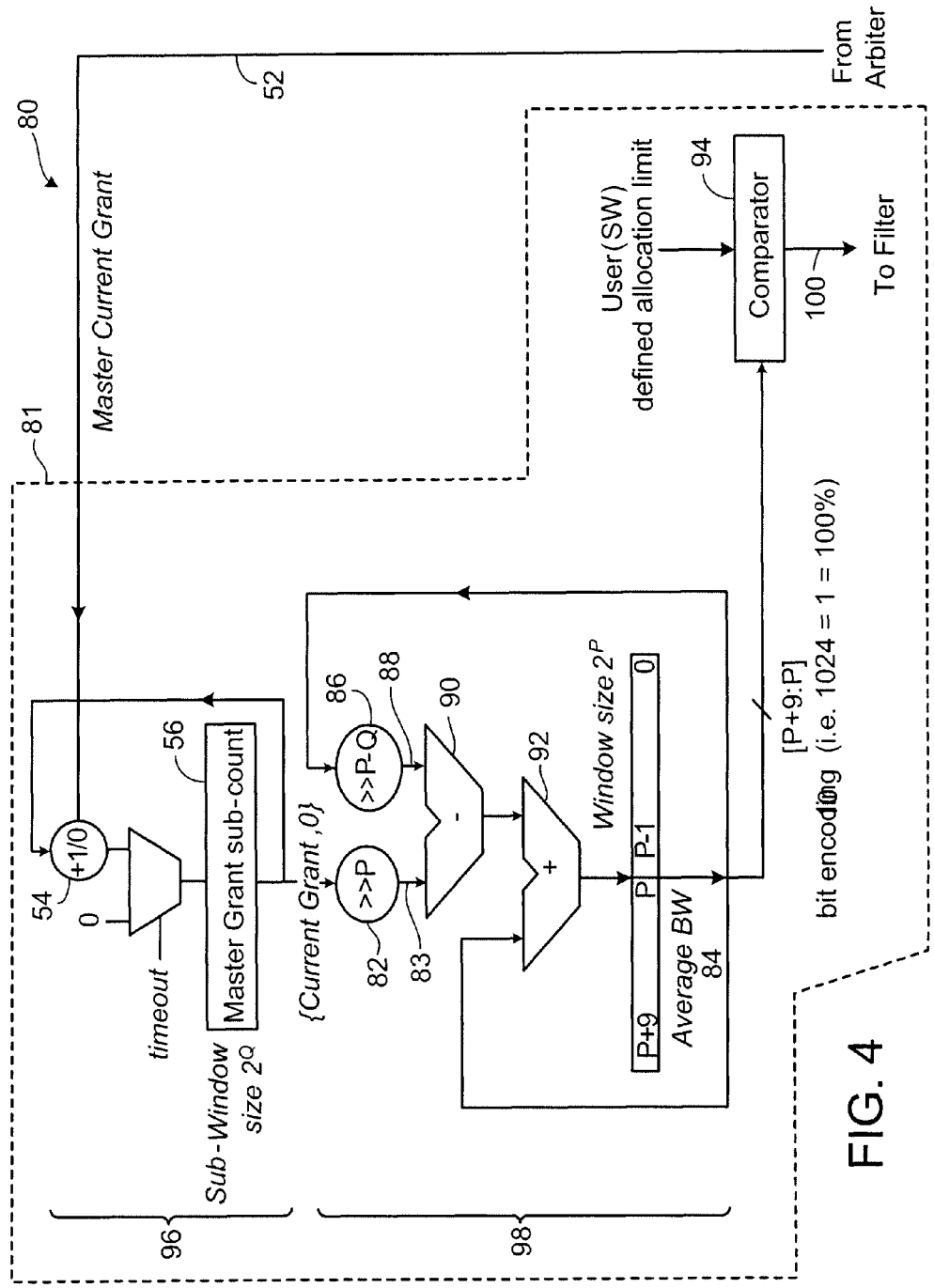
FIG. 4 is a diagram of a circuit for implementing an exponentially weighted moving average filter.

Referring to FIG. 4, a circuit 80 can be used to implement an exponentially weighted moving average filter. A logic unit 81 includes mechanisms for updating a master grant sub-count and an average bandwidth based on information from the arbiter 22 indicating whether a master is granted access to the shared bus 12 during each clock cycle. The arbiter 22 sends a signal 52 to control an adder 54 to add a 1 or 0 grant value to a master grant sub-count 56, which represents the number of grant clock cycles in the most recent sub-window. After the end of a sub-window, the master grant sub-count 56 is shifted P bits by using a shifter 82. The output 83 of the shifter 82 represents the value (SubCount(k+β)>>P) in Equation 7. An average bandwidth value 84 is right-shifted P−Q bits by using a shifter 86. The output 88 of the shifter 86 resents the value ($\overline{X}(k)$>>(P−Q)) in Equation 7. The output 88 is subtracted (90) from the output 83, and the result is added (92) to the average bandwidth value 84. A comparator 94 compares the average bandwidth 84 with a software defined allocation limit, and sends the comparison result 100 to the filter 20.

In the implementation above, the sub-window counter 56 reduces the logic power consumption. A portion 96 of the circuit 80 for counting the master grant sub-count is synchronized with the arbitration cycle, whereas a portion 98 of the circuit 80 for calculating the average bandwidth is synchronized with the sub-window boundaries. The portion 98 operates at a lower frequency and consumes less power than if the sub-windows were not used.

In the example of FIG. 4, the history window length is $2^P$ clock cycles and the average bandwidth encoding is performed using 10-bit values, which provides a good monitoring accuracy. The sub-window counter is set to $2^Q$ clock cycles, where Q<P. Simulations show that using Q=P−S with S=4 or 5 (so that the sub-window length is about 1/16 or 1/32 of the history window length) provides a good balance between power and filter accuracy.

The logic unit 81 can be part of a monitor unit 16 in FIG. 1B. The logic unit 81 updates the master grant sub-count 56 and the average bandwidth 84 for one master 14. If the system includes N masters, as shown in FIG. 1C, then N logic units 81 can be used to update the master grant sub-counts and the average bandwidths for the N masters.

Arbitration

The following describes arbitration schemes used in the system 6. The arbitration among requests from competing masters 14 is performed in accordance with the system requirements.

Figure 5:
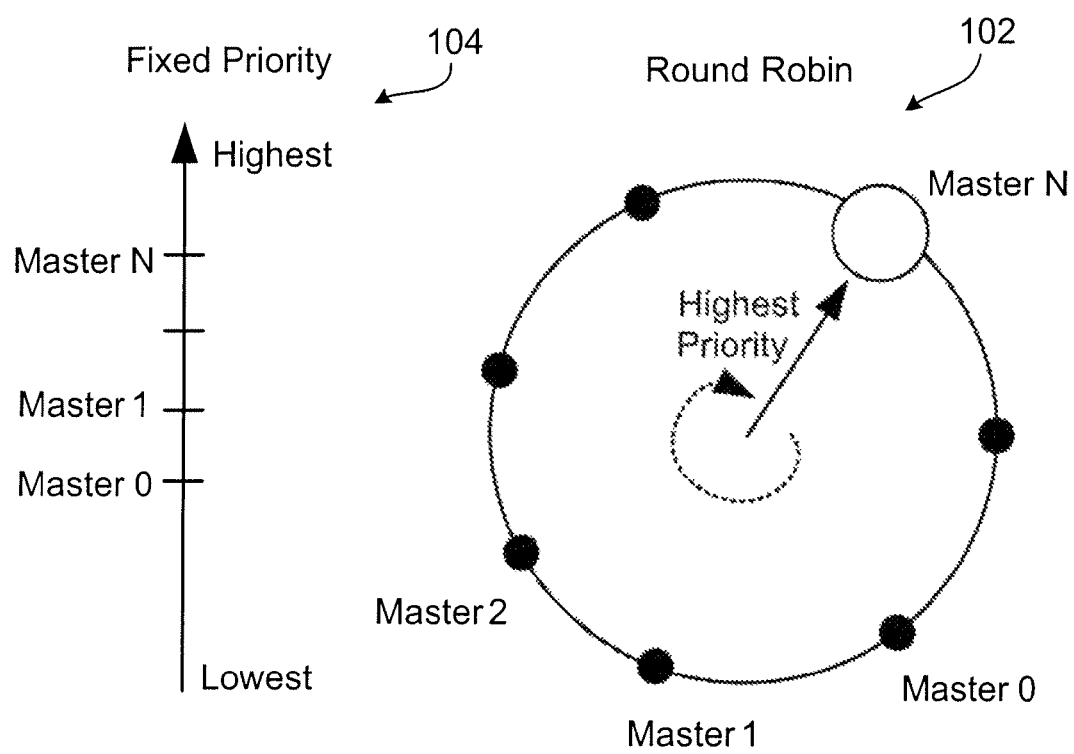
FIG. 5 show diagrams of arbitration schemes.

Referring to FIG. 5, in some implementations, a round robin arbitration scheme (as represented by diagram 102) and a fixed priority arbitration scheme (as represented by diagram 104) can be used independently or in combination. For example, if at any given time no master needs to be given a priority over the others, then a simple round robin or fair-share scheme may be used.

If some masters are more latency sensitive than others, an uneven priority scheme may give better results. In some examples, an uneven priority scheme can be achieved by using a fixed priority arbitration. If the sensitive masters provide "weight" or "priority level" information along with the requests, such information can also be used when performing the arbitration. For example, a request accompanied with a flag indicating a higher weight or priority level may be given a higher priority during arbitration.

If not all of the requests need a fixed priority among one another, a combination approach using a fixed priority among high priority requests and round-robin fall back decision among the requests can be used. Note that in some implementations, the round-robin arbitration scheme can achieve fair share when all masters request the bus, and when some masters remain idle for certain arbitration slots, the arbitration may bias toward one or more of the other masters at those arbitration slots.

Other arbitration schemes different from those described above can also be used.

Maximum Latency Control

The arbitration scheme that is used in the system 6 may influence the instantaneous granting decision and works well if associated with other feedback controls. It is also useful to monitor the access latency in addition to usage bandwidth because some masters may be stalled (not granted the bus) for a long period of time. The stalling may come from losing arbitration, long locked accesses, or bandwidth limitations. Each master may have different constraints in terms of maximum latency. For example, when servicing a slave peripheral, there is a risk of data loss if latency is above a threshold. Similarly, when processing processor cache misses, there may be performance losses (IPC degradation) if the latency is above a threshold.

Figure 6:
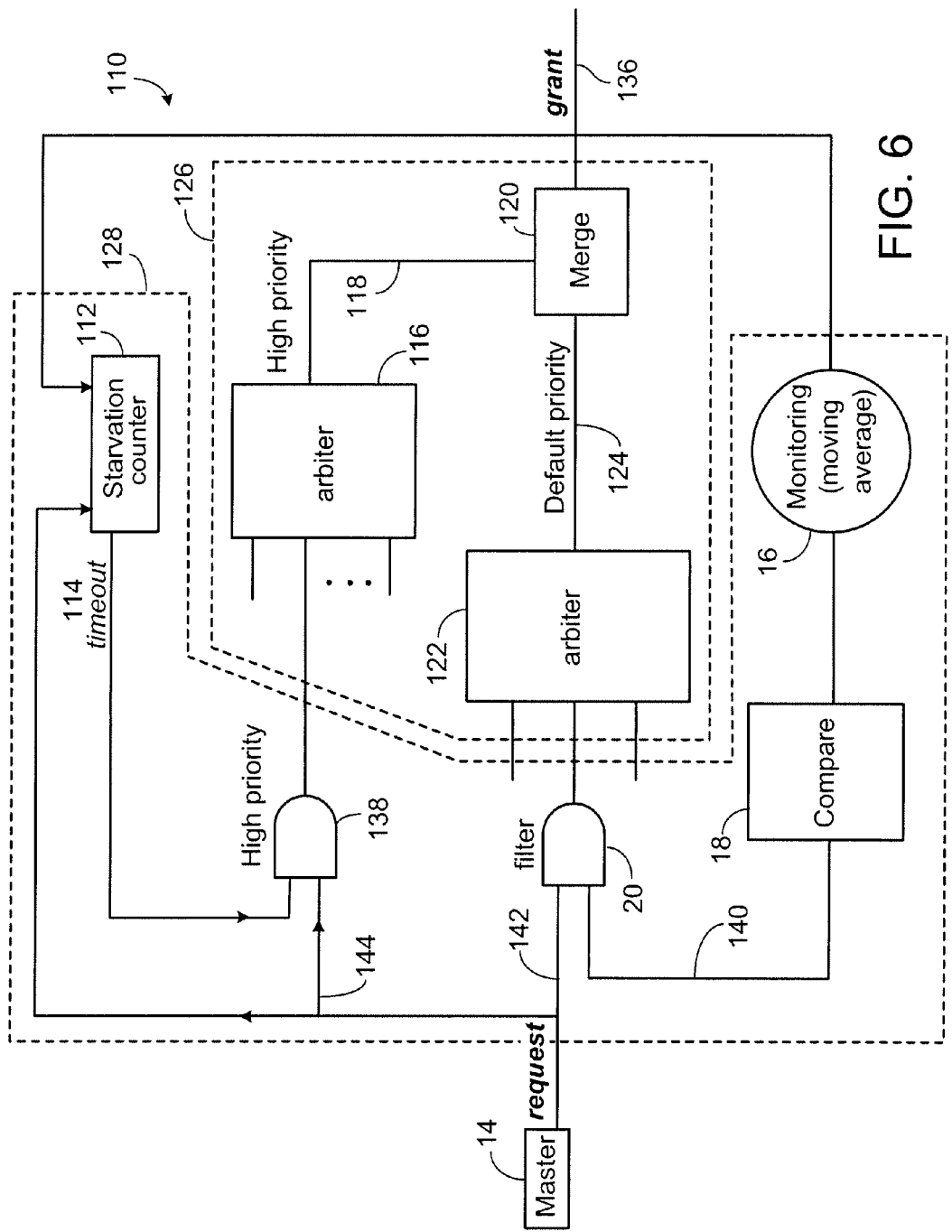
FIGS. 6 and 7 are diagrams of systems each including an arbitration module and a priority filter.

Referring to FIG. 6, in some implementations, a system 110 includes an arbitration module 126 that arbitrates requests from masters 14, and a priority filter 128 that filters the requests sent to the arbitration module 126. The arbitration module 126 includes a first arbiter 122 and a second arbiter 116. The first arbiter 122 arbitrates requests from masters 14 that have not exceeded their allocated bandwidths, and assigns a default (or normal) priority to the request granted by the first arbiter 122. The second arbiter 116 arbitrates requests having wait times higher than a threshold, and assigns a high priority to the request granted by the second arbiter 116.

The first arbiter 122 generates an output signal 124 that includes a request granted by the arbiter 122 and a flag indicating that the granted request has a default priority. The arbiter 116 generates an output signal 118 that include a request granted by the arbiter 116 and a flag indicating that the granted request has a high priority.

A merge unit 120 arbitrates between the output signals 124 and 118, grants a request having a higher priority, and generates an output signal 136 representing the request that has been granted. If a high priority request 118 and a default priority request 124 arrive at the merge unit 120 during the same arbitration cycle, the master 14 that sent the high priority request is granted access to the shared bus 12.

Note that a master 14 sends the same request to both arbiters 122 and 116, so it is possible that a request granted by the first arbiter 122 is the same as a request granted by the second arbiter 116.

The priority filter 128 includes a monitor unit 16, a compare unit 18, and a filter 20 that operate in a manner similar to those in FIG. 1B. The filter 20 receives a comparison result from the compare unit 18 on line 140, and a request on line 142. If the comparison result indicates that the master's bandwidth is below a corresponding threshold, the request passes the filter 20 and is sent to the first arbiter 122 for arbitration along with requests from other masters 14 whose bandwidths are below corresponding thresholds.

The priority filter 128 includes a "starvation counter" 112, which can be a simple cycle counter that counts the clock cycles between the time the master 14 requests the shared bus 12 and the time the shared bus 12 is granted to the master 14. When the starvation counter 112 exceeds a software defined limit, a timeout flag 114 is set to indicate that the corresponding master's request has a high priority. The timeout flag 114 is sent to a filter 138, which also receives the request from the master 14 on a signal line 144. When the timeout flag 114 has a logic high level, the request is sent to the second arbiter 116 for arbitration along with requests from other masters 14 whose wait times have exceeded corresponding thresholds. In performing the arbitration, the arbiter 116 does not consider whether the masters 14 have exceeded their allocated bandwidths.

The first arbiter 122 is sometimes referred to as a bandwidth control arbiter because it arbitrates requests from masters whose bandwidth is under control (below corresponding bandwidth thresholds). The second arbiter 116 is sometimes referred to as a starvation high priority arbiter because it arbitrates requests from masters whose latency are above corresponding thresholds and consequently their requests have high priority.

The arbitration module 126 can be viewed as a single fixed priority arbiter, even though internally it may have two arbiters. The priority filter 128 can be viewed as a mechanism for attaching weights (or priority levels) to the requests prior to sending the requests to the single fixed priority arbiter, which arbitrates the requests according to the weights assigned by the priority filter 128.

In the example of FIG. 6, the wait time threshold for each master 14 is set by software. If the wait time threshold is set too low, the master 14 may continuously trigger the starvation counter 112 to set high priority flags, causing the master 14 to obtain access to the shared bus 12 regardless of whether its bandwidth exceeded the allocated bandwidth. It is better to set appropriate wait time thresholds so that the starvation counter 112 is triggered sparingly.

Bandwidth Optimization

When bandwidth controlled bus arbitration as shown in FIGS. 1A, 1B, and 2 is used, the bus resources may not be fully utilized. For example, it is possible that some masters 14 that have exceeded their allocated bandwidths need to use the shared bus 12, but are not eligible to do so, while other masters 14 that are eligible do not need to use the bus 12. Thus, the bus 12 becomes idled even though there are masters 14 that need the bus 12. This may happen when the software responsible for allocating bandwidth does not accurately predict the actual bandwidth distribution between the masters 14 at all times.

In some implementations, to avoid inefficient use of bus resources, the system allows the bus bandwidth to be used outside of the predicted software model as long as it does not prevent bus bandwidth to be controlled using the model when the model applies.

Figure 7:
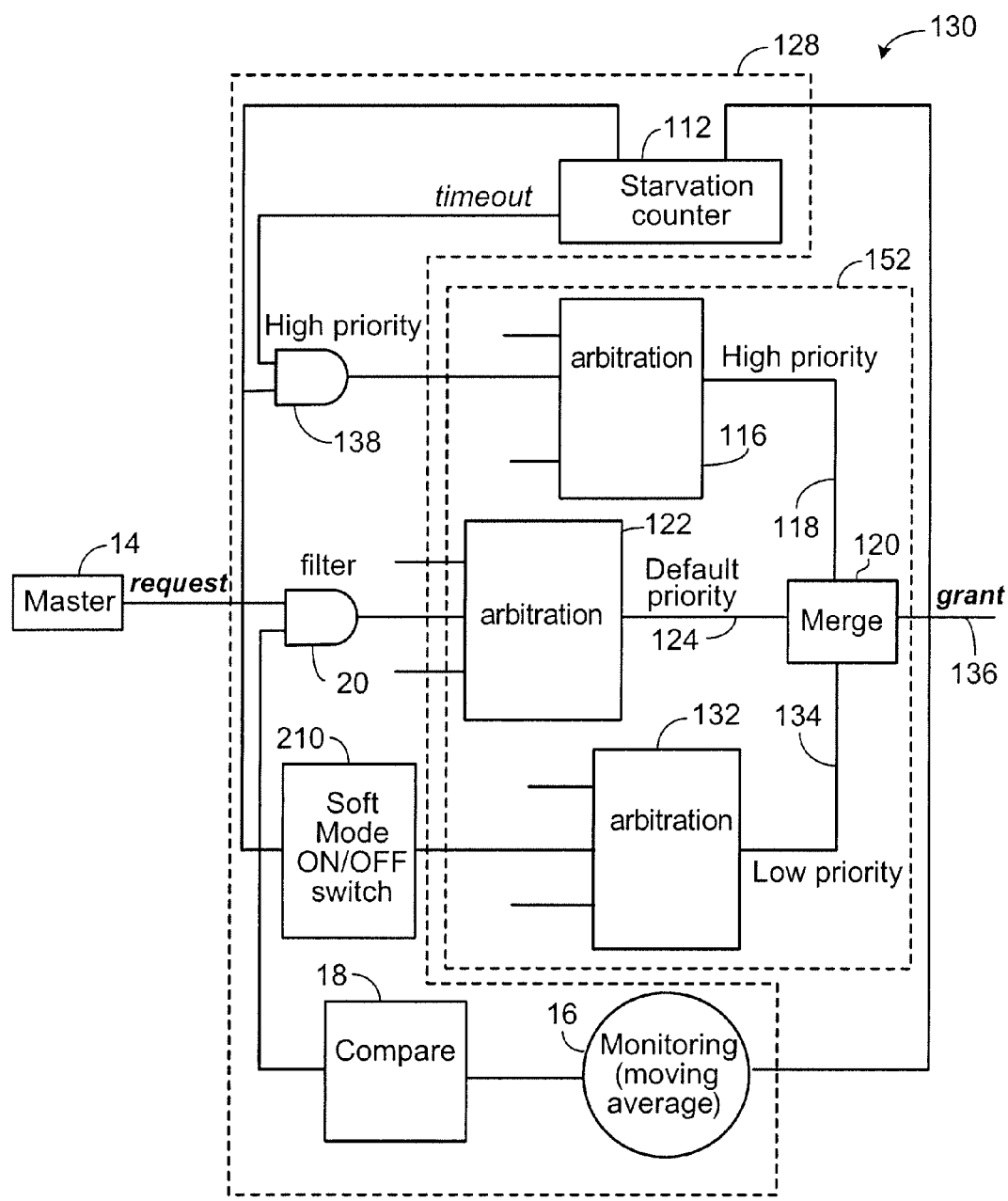

Referring to FIG. 7, in some implementations, a system 130 includes an arbitration module 152 that arbitrates requests from masters 14, and a priority filter 128 that filters the requests sent to the arbitration module 152. The priority filter 128 of FIG. 7 can be the same as the priority filter 128 of FIG. 6.

The arbitration module 152 includes a first arbiter 122 and a second arbiter 116, similar to the arbitration module 126 of FIG. 6. In addition, the arbitration module 152 includes a third arbiter 132 that arbitrates requests that come from the masters 14 directly without being filtered by the priority filter 154. Such requests may come from masters 14 whose bandwidths are below, equal to, or above their allocated bandwidths. The third arbiter 132 assigns a low priority to the request granted by the arbiter 132.

The third arbiter 132 is sometimes referred to as a resource optimization arbiter because it allows requests from masters whose bandwidths are above bandwidth thresholds to still use the shared bus 12 if there are no other requests from masters whose bandwidths are below thresholds or masters whose latency are above thresholds.

The arbiter 132 generates an output signal 134 that includes a request granted by the arbiter 132 and a flag indicating that the granted request has a low priority. A merge unit 120 arbitrates between the output signals 124, 118, and 134, grants a request having a higher priority, and generates an output signal 136 representing the request that has been granted. A low priority request 134 is granted by the merge unit 120 only when there is no other request with a higher priority, i.e., a request having a default priority or a high priority.

Note that a master 14 sends the same request to arbiters 122, 116, and 132, so it is possible that requests granted by the arbiters 122, 116, and 132 during the same arbitration cycle are the same request.

The system 130 allows a master 14 that already used all of its allocated bandwidth to still be granted the bus 12 if the master 14 requests the bus 12 when no other higher priority request is presented by the other masters 14. This allows a master 14 to use the full advantage of the bus 12 as long as it is available in spite of any software model prediction. This kind of "available resource" optimization may impact the ability of the arbitration module 152 to accurately distribute the bandwidth of the shared bus 12, as a low level priority access can still lock the bus for a non negligible period of time (with respect to the bandwidth control window).

In some implementations, a "soft mode" on/off switch 210 is provided to enable or disable use of the third arbiter 132 for optimizing bus bandwidth usage. For example, the switch 210 may be controlled by the software operating system. The system 130 may be provided to a developer that is developing an application to be executed on the system 130 as a master. When only one application is installed on the system 130, there may not be other masters (or only a few masters) competing with the application for use of a shared resource, so the application may often be granted access to the shared resource by the arbiter 132 even if the application exceeds its allocated bandwidth.

In order to accurately determine whether the application can function properly when there are many other masters competing for use of the shared resource, the developer can turn off the soft mode switch 210, so that requests are not sent to the third arbiter 132. In this case, the system 130 is said to be operating in a "hard mode". The application can access the shared bus 12 only if its bandwidth usage does not exceed a preset threshold. If the application can function properly when the system 130 is operating in the hard mode, then there is a high likelihood that the application will also operate properly when the system 130 is loaded with other applications that compete for the shared resource.

The arbitration module 152 can be viewed as a single fixed priority arbiter, even though internally it may have three arbiters. The priority filter 128 can be viewed as a mechanism for attaching weights (or priority levels) to the requests prior to sending the requests to the single fixed priority arbiter, which arbitrates the requests according to the weights assigned by the priority filter 128.

Latency Optimization in a Bandwidth Controlled Loop

In some implementations, the system uses an arbitration scheme that adapts itself in order to minimize the latency of a master 14 that does not use much of the bus bandwidth. This may solve a problem in which a master 14 that uses a large percentage of the available bandwidth may have a lower latency of access because it has a larger share of the bus time, while a master 14 that requests the bus 12 once in a while or for a short period of time compared to the history window 40 may be stalled for a longer time.

The bandwidth usage by each master 14 is continuously monitored and used by the bandwidth control loop. The same information can be used and fed back into the arbitration scheme to reverse bias the priority level as a function of the bandwidth usage. In some implementations, the priority of a request from a master 14 has an inverse relationship with respect to the bandwidth of the master 14. Thus, the greater bandwidth used by a master, the lower priority the request from the master.

For example, a first master that has a smaller bandwidth may be granted access to the shared bus 12 earlier than a second master that has a larger bandwidth. The first master can have a low latency since it does not have to wait for the second master. The second master may have a slightly higher latency because it has to wait for the first master to complete its transaction, but because the first master uses a small bandwidth, the transaction by the first master can likely be completed in a short amount of time, so the latency of the second master increases only slightly.

In some implementations, in order to reduce the complexity in implementing logic that can dynamically assign priority in an inverse relationship with respect to the bandwidth usage, the masters are grouped according to their bandwidth usage, requests from masters within the same group are arbitrated by the same arbiter, and requests from different groups are given different priorities in an inverse relationship according to the bandwidth usage associated with the group.

Figure 8:
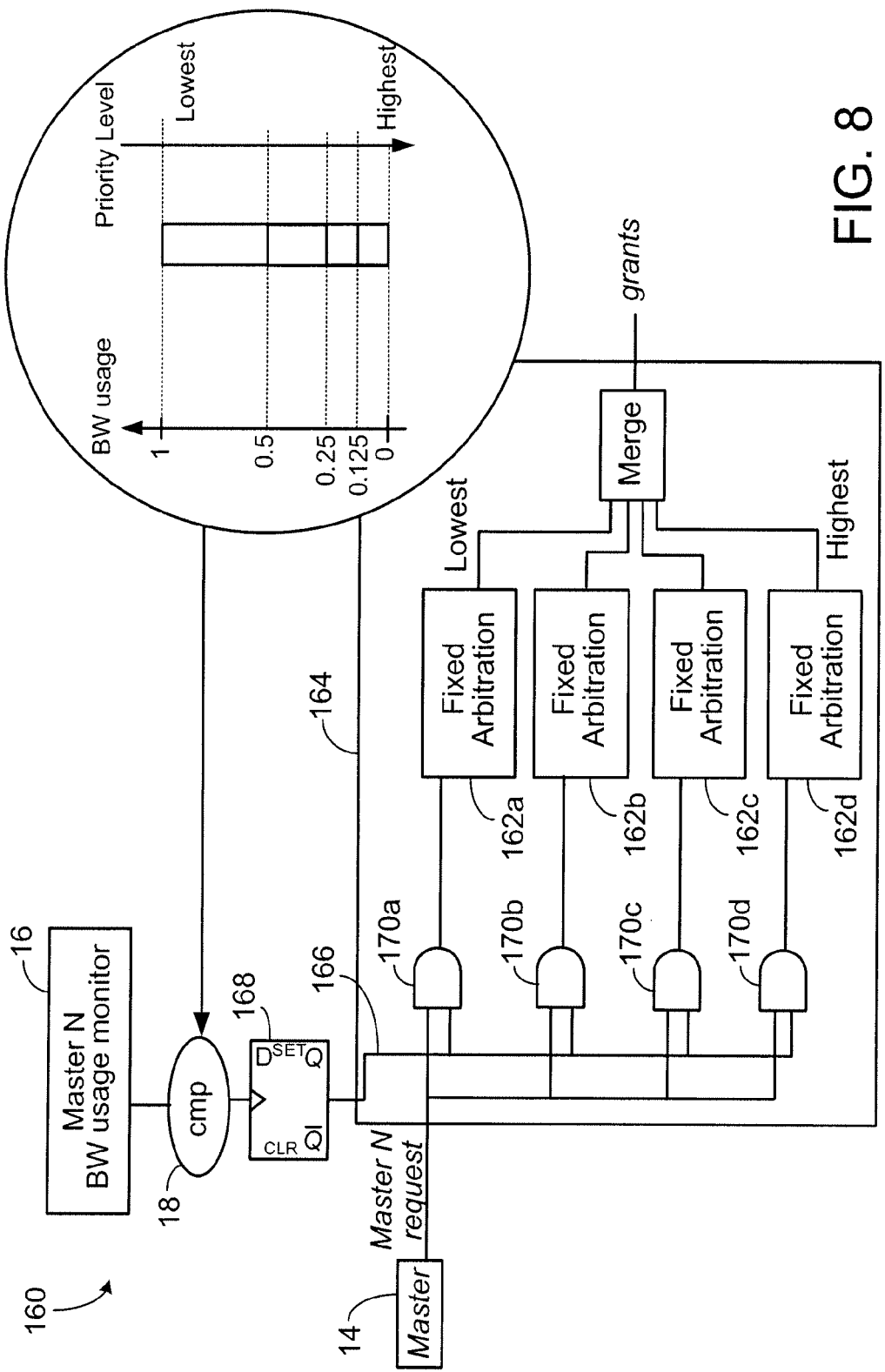
FIG. 8 is a diagram of an arbitration module that defines several priority levels.

Referring to FIG. 8, in some examples, a system 160 includes an arbitration module 164 that defines several priority levels to reduce the overall latency. In this example, four priority levels are defined. The arbitration module 164 has four arbiters 162a, 162b, 162c, and 162d, and each arbiter uses a fixed arbitration scheme, such as those shown in FIG. 5. Each arbiter is associated with a range of bandwidths and arbitrates requests from masters whose bandwidth usage fall within that range.

For example, the arbiter 162a arbitrates requests from masters whose bandwidth usage is between 0.5 to 1 (i.e., 50% to 100%), the arbiter 162b arbitrates requests from masters whose bandwidth usage is between 0.25 to 0.5, the arbiter 162c arbitrates requests from masters whose bandwidth usage is between 0.125 to 0.25, and the arbiter 162d arbitrates requests from masters whose bandwidth usage is between 0 to 0.125.

The outputs from the arbiters 162a to 162d have priorities that are in an inverse relationship with respect to the bandwidth range associated with the arbiters. The arbiter 162a is associated with the highest bandwidth range, so the request granted by the arbiter 162a is assigned the lowest priority. The arbiter 162d is associated with the lowest bandwidth range, so the request granted by the arbiter 162d is assigned the highest priority. The output from the arbiter 162c has the second highest priority, and the output from the arbiter 162b has the third highest priority.

Using the arbitration module 164, requests from masters having lower bandwidths can have higher priorities, and requests from masters having higher bandwidths can have lower priorities. This way, masters having low bandwidths (and whose requests tend to take a shorter time to complete) will not have to wait for a long time to gain access to the shared bus 12 because the bus 12 is being used by masters having high bandwidths (whose requests tend to take a longer time to complete).

The system 160 includes a bandwidth usage monitor unit 16 that monitors the bandwidth of a master using methods described above. A compare unit 18 compares the bandwidth usage of the master with predefined thresholds, such as 0.5, 0.25, and 0.125 in this example, to determine which bandwidth range the master is associated with. The compare unit 18 triggers a flip-flop 168, whose output is sent on a 4-bit bus 166 having four lines going to filters 170a, 170b, 170c, and 170d, respectively.

If the master's bandwidth usage is between 0.5 to 1, the flip-flop 168 outputs a binary signal 1000 on the bus 166, causing the filter 170a to pass the request to the arbiter 162a. If the master's bandwidth usage is between 0.25 to 0.5, the flip-flop 168 outputs a binary signal 0100 on the bus 166, causing the filter 170b to pass the request to the arbiter 162b. If the master's bandwidth usage is between 0.125 to 0.25, the flip-flop 168 outputs a binary signal 0010 on the bus 166, causing the filter 170c to pass the request to the arbiter 162c. If the master's bandwidth usage is between 0 to 0.125, the flip-flop 168 outputs a binary signal 0001 on the bus 166, causing the filter 170d to pass the request to the arbiter 162d.

In FIG. 8, one master 14, one monitor unit 16, one compare unit 18, a flip-flop 168, and four corresponding filters 170a to 170d are shown. The system can have multiple masters, each master being associated with a monitor unit, a compare unit, a flip-flop, and four filters that pass the requests to the arbiters 162a to 162d, respectively.

In some implementations, the sub-division of the bandwidth range can be a power of 2, which works well for a simple compare logic (only a few bits required). The bandwidth range can also be divided into any other number of sub-divisions.

In some implementations, in the system 130 of FIG. 7, the bandwidth control arbiter 122 and the resource optimization arbiter 132 can each be replaced by the arbitration module 164 of FIG. 8. The starvation high priority arbiter 116 can remain the same as before as it is used as an override when the wait time is above a threshold.

The arbitration module 164 in FIG. 8 applies different weights or priority levels to the requests from masters whose bandwidth usage belongs to different ranges. In some implementations, a weighing can be applied on the requests with respect to the allocated bandwidth usage (instead of the bandwidth usage). For example, a first arbiter can arbitrate requests from masters whose bandwidth usage is between 50% to 100% of the allocated bandwidth. This can include requests from a first master allocated 5% of the total bus bandwidth and used 50% or more of the allocated bandwidth, and requests from a second master allocated 60% of the total bus bandwidth and used 50% or more of the allocated bandwidth. A second arbiter can arbitrate requests from masters whose bandwidth usage is between 25% to 50% of the allocated bandwidth, a third arbiter can arbitrate requests from masters whose bandwidth usage is between 12.5% to 25% of the allocated bandwidth, and a fourth arbiter can arbitrate requests from masters whose bandwidth usage is between 0 to 12.5% of the allocated bandwidth.

This can help distribute the bandwidth with optimum latency when multiple masters compete for a similar share of the bus bandwidth. However, it may not help reduce the latency of a master using very little of the bus bandwidth compared to a master using a lot of the bus bandwidth.

In some implementations, a system includes a combination of both types of weights: based on the percentage of allocated bandwidth used and the percentage of the total bus bandwidth used. This may increase the arbitration logic complexity and timing. As a trade off, a system can increase the number of bandwidth divisions in the example of FIG. 8. For example, the arbitration module 164 can have five arbiters associated with five bandwidth ranges (50% to 100%), (25% to 50%), (12.5% to 25%), (6.25% to 12.5%), and (0% to 6.25%), and have outputs that are assigned five different weights or priority levels.

If latency is critical for some masters (such as the DSP core), requests from such masters can be assigned a highest priority, and a final fixed scheme arbitration can be used to allow a request having the highest priority to override any other requests having a lower priority.

In some implementations, some requests have built-in weights (such as a cache line fill), and this added information can be used to override any level of arbitration priority. If such mechanism is used, its effect on the rest of the system should be reviewed since it takes precedence over of the bandwidth control loop. Because it is useful to maintain a bandwidth controlled system, in some examples, the line fill information can be used to override the last level of request weighing, but not override the starvation controls or the bandwidth control mechanisms.

Figure 9:
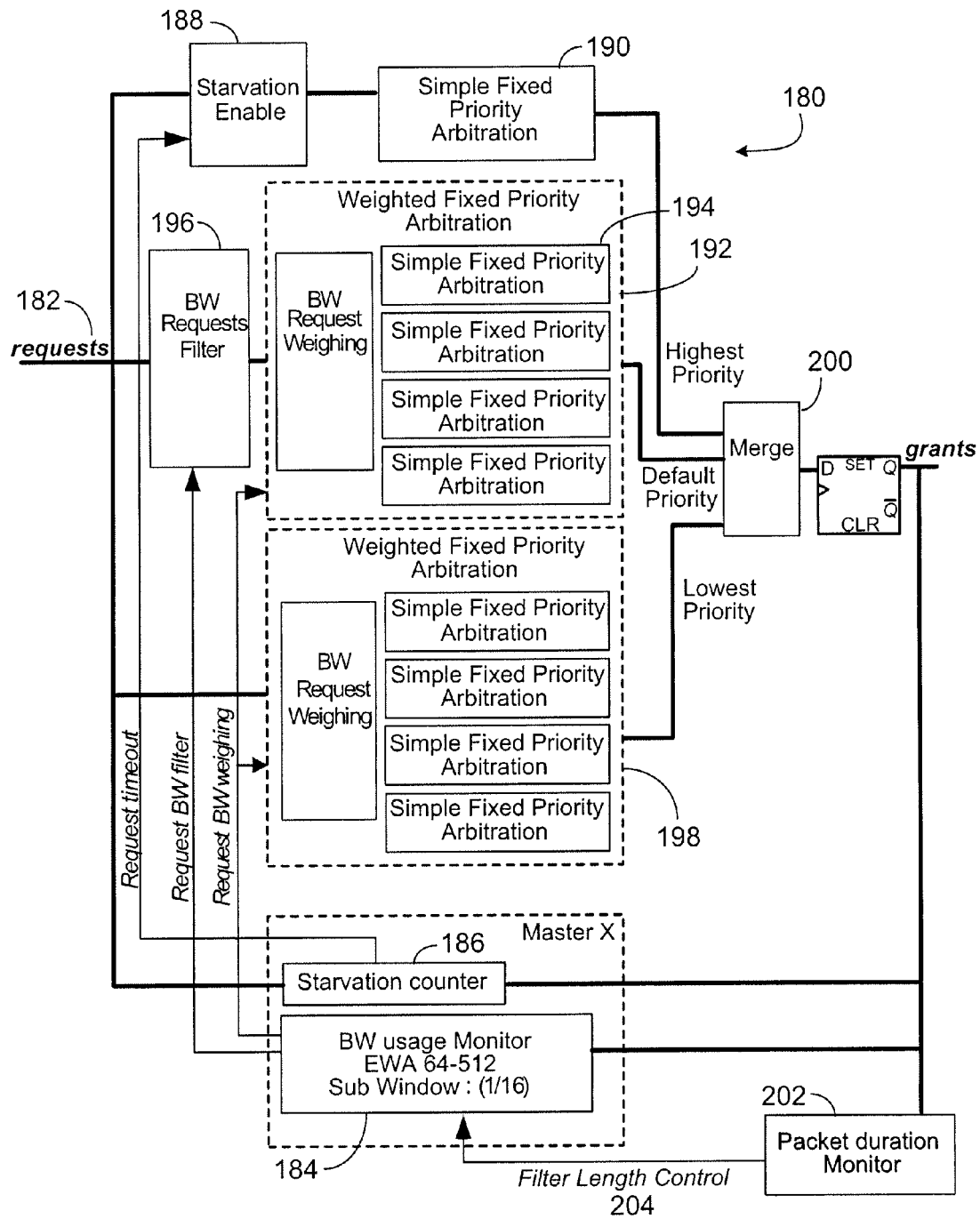
FIG. 9 is a diagram of an arbitration circuit.

Referring to FIG. 9, an arbitration circuit 180 for arbitrating requests from masters 14 uses various arbitration schemes described above. A bus usage monitor unit 184 monitors the bandwidth usage of the masters 14 using an exponentially weighted moving averaging filter (see FIG. 4) per master. The filter length (i.e., length of the history window 40) can be adjusted from, e.g., 64 clock cycles to 256 clock cycles (e.g., can go up to 512 clock cycles if packet size or access duration exceeds 32 cycles). To reduce power consumption, the filters can be implemented using a sub-window counter having $\frac{1}{16}$ of the filter length. The exponentially weighted moving averaging filter is easier to implement (compared to the simple moving average filter of FIG. 3) as it does not require memory, and has a performance that is close to the simple moving average filter, especially in soft mode. In soft mode, masters whose bandwidths exceed corresponding thresholds can still access the shared bus 12 if no requests are sent from masters whose bandwidths are below corresponding thresholds.

A starvation counter 186 is used to provide priority override (high priority requests) when latency rises beyond a threshold. A software programmable starvation enable filter 188 compares the starvation count with programmable latency thresholds. The software sets the threshold for the starvation enable filter 188 to prevent a failure condition, such as timeout. The threshold is selected so that effects on the minimum bandwidth allocation is reduced.

The arbitration circuit 180 include arbiters designed to reduce the average latency (better IPC). The arbitration is performed in three parallel fronts. A starvation high priority arbiter 190 arbitrates requests that pass the starvation enable filter 188 using a simple fixed priority arbitration scheme to handle one-off requests from masters 14 whose wait times are above corresponding latency thresholds. The requests granted by the starvation high priority arbiter 190 has a high priority.

A bandwidth control arbiter 192 arbitrates requests that pass a bandwidth request filter 196, in which the requests granted by the bandwidth control arbiter 192 have a default priority. The arbitration is distributed amongst four or five weighted sub-arbitration units 194. The weighing of the request is inversely proportional to the current bandwidth used by the corresponding master.

A non-bandwidth controlled arbiter 198 arbitrates requests from masters 14 without filtering (i.e., regardless of the bandwidth usage of the masters). The requests granted by the non-bandwidth controlled arbiter 198 has a low priority. Similar to the arbiter 192, the arbitration in arbiter 198 is distributed among four or five weighted sub-arbitration units 194, and the weighing of the request has an inverse relationship with respect to the current bandwidth used by the corresponding master 14. This allows optimization of the available bandwidth.

The requests from the arbiters 190, 192, and 198 are merged by the merge unit 200.

In some implementations, to reduce the software control requirements, a bus average packet size monitor unit 202 is used to monitor the average packet size associated with the requests. The bus average packet size monitor unit 202 can be similar to the bandwidth monitor units (e.g., 184), but is not replicated for each master. For example, one packet size monitor unit 202 can be used even if there are multiple masters 14. The bus average packet size monitor unit 202 outputs a filter length control signal 204 to control the length of the history window 40 of the exponentially weighted moving average filter 184. By monitoring the average packet size, the filter length can be adjusted to fit the average packet size to increase filter accuracy. At any given time, the filter lengths are the same for all exponentially weighted moving average filters. Simulations show that acceptable filter accuracy can be achieved when the filter length is about 16 times the average packet size.

Although some examples have been discussed above, other implementations and applications are also within the scope of the following claims. For example, operation pipelining and context swapping may be used such that masters are granted access to the shared bus before operations performed by previously granted masters are completed. The shared bus 12 can access a resource different from those described above. The resource can be, for example, a communication port, a serial or parallel port, an input/output device, a hardware accelerator, a hard disk drive, an optical disk drive, a flash memory, or other types of storage devices. The arbitration schemes described above can be used to arbitrate requests for resources that do not necessarily have to be accessed through a bus. For example, the shared resources can be accessed wirelessly. The masters may send requests to access a storage wirelessly. The masters may send requests to use a wireless channel to send or receive data.

The requests from the masters can be used to cause certain actions to be performed by slave devices. For example, the masters may be hardware modules or software applications executing on a robot having several actuators, such as actuators for controlling arms and legs of the robot. The masters may be different control mechanisms for controlling the actions of the robots according to various guidelines, and different masters may compete to adjust the actuators in different ways. For example, a forward movement control master may want to move a leg of the robot in a certain direction in order to achieve a target speed, while a collision avoidance master may want to move the leg in a different direction to avoid collision with an object. The arbitration schemes described above can be used to allow the masters to each have its allocated share of control of the robotic leg, in which latency for the masters is reduced, and a starvation override is provided to ensure that no master waits for a length of period beyond a corresponding latency threshold.

What is claimed is:

1. A method comprising:
   monitoring usage of a shared bus by each of a plurality of masters;
   receiving requests to use the shared bus by the masters;
   comparing usage of the shared bus by the masters with corresponding bandwidth thresholds;
   using a first arbiter to arbitrate the requests from masters whose usages of the shared bus are below corresponding bandwidth thresholds;
   using a second arbiter to arbitrate the requests from masters whose wait times are above corresponding latency thresholds; and
   using a merge unit to merge the requests granted by the first and second arbiters, in which different priorities are given to the requests granted by the first and second arbiters.

2. The method of claim 1, further comprising using the shared bus to access at least one of a memory device or a peripheral device.

3. The method of claim 1, further comprising
continuously monitoring the usage of the shared bus by the masters, and
at each arbitration cycle, receiving zero or more requests for usage of the shared bus from zero or more of the masters, determining the usage of the shared bus by the masters sending the requests, and arbitrating the requests whose corresponding masters have usages below corresponding bandwidth thresholds.

4. The method of claim 1 in which the time window comprises a moving time window having a fixed length of time.

5. The method of claim 1, comprising, for each sub-window periods within the time window and for each master, storing in memory a grant sub-count representing a number of clock cycles the corresponding master is granted access to the shared bus during the corresponding sub-window period, each sub-window period comprising two or more clock cycles.

6. The method of claim 1, further comprising
arbitrating requests from all masters regardless of the usages of the shared bus separately from arbitrating requests from masters whose usage of the shared bus are below corresponding bandwidth thresholds; and
granting one of the masters to use the shared bus based on both arbitrations.

7. The method of claim 1, further comprising assigning requests from masters whose usage of the shared bus are below corresponding bandwidth thresholds to have a higher priority than masters whose usage of the shared bus are above or equal to corresponding bandwidth thresholds.

8. The method of claim 1 in which at least two masters have different bandwidth thresholds.

9. The method of claim 1 in which the masters have a same bandwidth threshold.

10. The method of claim 1 in which each bandwidth threshold represents a percentage of the bus bandwidth that is allocated to a corresponding master.

11. The method of claim 1, comprising selecting one of a plurality of sub-arbiters within the first arbiter to arbitrate the request, each sub-arbiter corresponding to a range of bus bandwidth usage levels such that requests from masters having bus bandwidth usage levels within a same range are arbitrated by a same sub-arbiter, and requests from masters having different ranges of bus bandwidth usage levels are arbitrated by different sub-arbiters.

12. The method of claim 11, comprising assigning a higher priority to a first request granted by a first sub-arbiter than a second request granted by a second sub-arbiter, in which the first sub-arbiter corresponds to a lower range of bus bandwidth usage levels than the second sub-arbiter.

13. The method of claim 1 in which the usage of the shared bus by each master is monitored based on a number of clock cycles the master is granted access to the shared bus within a time window.

14. The method of claim 13, comprising determining an average grant value representing the percentage of clock cycles each master is granted access to the shared bus within the time window.

15. The method of claim 14 in which determining the average grant value comprises determining a difference between a first grant value indicating whether the master is granted access to the shared bus at a most recent clock cycle, and a second grant value indicating whether the master is granted access to the shared bus in an earliest clock cycle within the time window.

16. The method of claim 14 in which the average grant value is determined based on a grant value indicating whether the master is granted access to the shared bus at a most recent clock cycle, and a previous average grant value representing the percentage of clock cycles the master is granted access to the shared bus within the time window prior to the most recent clock cycle.

17. The method of claim 14 in which the average grant value is determined based on a grant sub-count representing the number of clock cycles the master is granted access to the shared bus within a most recent sub-window period, and a previous average grant value representing the percentage of clock cycles the master is granted access to the shared bus within the time window prior to the most recent sub-window period, each sub-window period comprising two or more clock cycles.

18. The method of claim 13, comprising, for each clock cycle within the time window and for each master, storing in memory a grant value indicating whether the corresponding master is granted access to the shared bus at the corresponding clock cycle.

19. A method comprising:
monitoring usage of a shared bus by each of a plurality of masters;
receiving requests to use the shared bus from at least some of the masters;
assigning normal weights to requests to use the shared bus from masters whose usage of the shared bus are below corresponding bandwidth thresholds;
assigning low weights to requests to use the shared bus from masters whose usage of the shared bus are above or equal to corresponding bandwidth thresholds;
using a first arbiter to arbitrate the requests to use the shared bus based on an arbitration policy, taking into account the weights of the requests;
using a second arbiter to arbitrate the requests from masters whose wait times are above corresponding latency thresholds; and
using a merge unit to merge the requests granted by the first and second arbiters, in which different priorities are given to the request granted by the first and second arbiters.

20. The method of claim 19 in which assigning normal weights comprises assigning a plurality of normal weights according to an inverse relationship to the bus usage bandwidth by the masters, in which higher normal weights are given to requests from masters having a lower bus usage bandwidth.

21. The method of claim 19, comprising providing an option for disabling the assignment of low weights to requests from masters whose usage of the shared bus are above or equal to corresponding bandwidth thresholds so that the requests from masters whose usages of the shared bus are above or equal to corresponding bandwidth thresholds are not eligible for arbitration.

22. The method of claim 19 in which the usage of the shared bus by each master is determined based on a number of clock cycles the master is granted access to the shared bus within a time window, and the usage of the shared bus by a master is determined to be below the corresponding bandwidth threshold if the number of clock cycles the master is granted access to the shared bus within the time window is smaller than a certain value, or if a value derived from the number of clock cycles the master is granted access to the shared bus within the time window is smaller than a certain value.

23. A method comprising:
arbitrating requests from a plurality of masters for use of a shared bus; and
using a first arbiter to control bandwidth of usage of the shared bus by the masters based on feedback information indicating usage of the shared bus by each master in which requests from masters whose usages of the shared bus are above or equal to corresponding thresholds are filtered out prior to arbitration;
using a second arbiter to control latency for usage of the shared bus by arbitrating requests from masters whose wait times are above corresponding latency thresholds; and
using a merge unit to merge the requests granted by the first and second arbiters, in which different priorities are given to the requests granted by the first and second arbiters.

24. The method of claim 23, further comprising improving latency for usage of the shared bus by using a plurality of arbiters to arbitrate requests from masters whose usages of the shared bus are below corresponding thresholds, each arbiter corresponding to a range of bus bandwidth usage levels such that requests from masters having a same range of bus bandwidth usage levels are arbitrated by a same arbiter, and requests from masters having different ranges of bus bandwidth usage levels are arbitrated by different arbiters.

25. The method of claim 23, further comprising increasing usage of the shared bus by separately arbitrating requests from all masters regardless of usages of the shared bus, and merging grants from the two arbitrations.

26. The method of claim 23 in which the usage of the shared bus by each master is determined based on a number of clock cycles the master is granted access to the shared bus within a time window, and the usage of the shared bus by a master is determined to be above or equal to the corresponding bandwidth threshold if the number of clock cycles the master is granted access to the shared bus within the time window is above or equal to a certain value, or if a value derived from the number of clock cycles the master is granted access to the shared bus within the time window is above or equal to a certain value.

27. The apparatus of claim 23 in which the filter comprises a moving average filter that filters the requests from the masters based on a number of times that each master is granted access to the shared bus within a moving time window.

28. The apparatus of claim 23 in which the usage of the shared bus by a master is determined to be below the corresponding bandwidth threshold if the number of clock cycles the master is granted access to the shared bus within the moving time window is below a certain value, or if a value derived from the number of clock cycles the master is granted access to the shared bus within the moving time window is below a certain value.

29. An apparatus comprising:
a first filter to filter requests from masters requesting access to a shared bus, the first filter assigning normal weights to requests from masters whose usages of the shared bus are below corresponding bandwidth thresholds;
a second filter to filter requests from the masters requesting access to the shared bus, the second filter assigning low weights to requests from masters whose usages of the shared bus are above or equal to corresponding bandwidth thresholds; and a first arbiter to arbitrate the requests filtered by the first and second filters using an arbitration policy, taking into account the weights of the requests;
a second arbiter to arbitrate requests from masters whose wait times are above corresponding latency thresholds; and
a merge unit to merge the requests granted by the first and second arbiters, in which different priorities are given to the requests granted by the first and second arbiters.

30. The apparatus of claim 29 in which the first filter assigns a plurality of normal weights according to an inverse relationship to the bus usage bandwidth by the masters, in which higher normal weights are given to requests from masters having a lower bus usage bandwidth.

31. The apparatus of claim 29, further comprising a switch to disable the second filter so that the requests from masters whose usages of the shared bus are above or equal to corresponding bandwidth thresholds are not eligible for arbitration.

32. The apparatus of claim 29 in which the usage of the shared bus by each master is determined based on a number of clock cycles the master is granted access to the shared bus within a time window, and the usage of the shared bus by a master is determined to be below the corresponding bandwidth threshold if the number of clock cycles the master is granted access to the shared bus within the time window is smaller than a certain value, or if a value derived from the number of clock cycles the master is granted access to the shared bus within the time window is smaller than a certain value.

33. An apparatus comprising:
a filter to filter requests from masters requesting access to a shared bus, the filter passing requests from masters whose usages of the shared bus are below corresponding bandwidth thresholds;
a first arbiter to arbitrate requests that pass the filter;
a second arbiter to arbitrate requests from masters whose wait times are above corresponding latency thresholds; and
a merge unit to merge the requests granted by the first and second arbiters, in which different priorities are given to the requests granted by the first and second arbiters.

34. The apparatus of claim 33 in which a higher priority is given to the request granted by the second arbiter than the request granted by the first arbiter.

35. The apparatus of claim 33, further comprising a memory device that can be accessed by the masters through the shared bus.

36. The apparatus of claim 33, further comprising the masters.

37. The apparatus of claim 36 in which each of the masters comprises a software application or a hardware device.

38. The apparatus of claim 33, further comprising a memory to store, for each master and for each clock cycle, a grant value indicating whether the corresponding master is granted access to the shared bus during the corresponding clock cycle.

39. The apparatus of claim 38 in which, at each clock cycle and for each master, the moving average filter determines a difference between the grant value for the most recent clock cycle, and the grant value for the earliest clock cycle stored in the memory.

40. The apparatus of claim 33, further comprising a memory to store, for each master and for each sub-window within the time window, a grant sub-count indicating a number of times the corresponding master is granted access to the shared bus for the corresponding sub-window, each sub-window comprising two or more clock cycles.

41. The apparatus of claim 40 in which, at each clock cycle and for each master, the moving average filter determines a difference between the grant sub-count for the most recent sub-window and the grant sub-count for the earliest sub-window stored in the memory.

42. The apparatus of claim 33 in which the filter determines, for each master, an average grant value representing the average number of times the master is granted access to the shared bus per clock cycle within the time window.

43. The apparatus of claim 42 in which the filter determines the average grant value based on a grant value indicating whether the master is granted access to the shared bus at a most recent clock cycle and a previous average grant value representing the average number of times the master is granted access to the shared bus per clock cycle within the time window prior to the most recent clock cycle.

44. The apparatus of claim 33 in which the filter comprises
a first storage storing a grant sub-count indicating a number of times the master is granted access to the shared bus during a most recent sub-window period, and
a second storage storing a previous average grant value indicating an average number of times the master is granted access to the shared bus per clock cycle within the time window prior to the most recent sub-window period, each sub-window period comprising two or more clock cycles, and
the filter determines the average grant value based on the grant sub-count and the previous average grant value.

45. The apparatus of claim 33, in which a higher priority is given to the request granted by the second arbiter than the request granted by the first arbiter.

46. The apparatus of claim 33, further comprising a third arbiter to arbitrate requests from all of the masters regardless of the usages of the shared bus.

47. The apparatus of claim 46, in which the merge unit merges the requests granted by the first, second, and third arbiters, in which a higher priority is given to the request granted by the first arbiter than the request granted by the second arbiter and the third arbiter.

48. The apparatus of claim 33 in which the first arbiter comprises a plurality of sub-arbiters, each sub-arbiter corresponding to a range of bus usage levels, each sub-arbiter arbitrating requests from masters whose bus usage levels fall within the range of bus usage levels corresponding to the sub-arbiter.

49. The apparatus of claim 48 in which requests granted by a first sub-arbiter is given a higher priority than requests granted by a second sub-arbiter, in which the first sub-arbiter corresponds to a lower range of bus bandwidth usage levels than the second sub-arbiter.

50. The apparatus of claim 33 in which the filter monitors, for each master, a number of times or an average number of times the master is granted access to the shared bus.

51. The apparatus of claim 33 in which the first arbiter comprises a plurality of sub-arbiters, each sub-arbiter corresponding to a range of bus usage levels, each sub-arbiter arbitrating requests from masters whose bus usage levels fall within the range of bus usage levels corresponding to the sub-arbiter, requests granted by a sub-arbiter corresponding to a lower range of bus bandwidth usage levels is given a higher priority than requests granted by another sub-arbiter corresponding to a higher range of bus bandwidth usage levels.

52. The apparatus of claim 33 in which each of the masters comprises a software application or a hardware device.

53. The apparatus of claim 33 in which the usage of the shared bus by each master is determined based on a number of clock cycles the master is granted access to the shared bus within a time window, and the usage of the shared bus by a master is determined to be below the corresponding bandwidth threshold if the number of clock cycles the master is granted access to the shared bus within the time window is smaller than a certain value, or if a value derived from the number of clock cycles the master is granted access to the shared bus within the time window is smaller than a certain value.

54. An apparatus comprising:
a filter to filter requests from masters requesting access to a shared bus, the filter passing requests from masters whose usages of the shared bus are below corresponding bandwidth thresholds;
a first arbiter to arbitrate requests that pass the filter;
a second arbiter to arbitrate requests from masters whose wait times are above corresponding latency thresholds;
a third arbiter to arbitrate requests from all of the masters regardless of the usages of the shared bus; and
a merge unit to merge the requests granted by the first, second, and third arbiters, in which different priorities are given to the request granted by the first, second, and third arbiters.

55. The apparatus of claim 54 in which a higher priority is given to the request granted by the second arbiter than the request granted by the first and third arbiters, and a higher priority is given to the request granted by the first arbiter than the request granted by the third arbiter.

56. The apparatus of claim 54 in which the first arbiter comprises two or more weighted sub-arbitration units, and the arbitration is distributed amongst the weighted sub-arbitration units.

57. The apparatus of claim 56 in which weighing of requests by the two or more weighted sub-arbitration units is inversely proportional to current bandwidths used by the corresponding masters.

58. The apparatus of claim 54 in which the third arbiter comprises two or more weighted sub-arbitration units, and the arbitration is distributed amongst the weighted sub-arbitration units.

59. The apparatus of claim 58 in which weighing of requests by the two or more weighted sub-arbitration units is inversely proportional to current bandwidths used by the corresponding masters.

60. The apparatus of claim 54 in which the third arbiter uses a round-robin arbitration scheme to arbitrate requests from the masters.

61. The apparatus of claim 54 in which each of the masters comprises a software application or a hardware device.

* * * * *

UNITED STATES PATENT AND TRADEMARK OFFICE
CERTIFICATE OF CORRECTION

PATENT NO. : 8,032,678 B2  
APPLICATION NO. : 12/265250  
DATED : October 4, 2011  
INVENTOR(S) : Jean-Louis Tardieux et al.

Page 1 of 1

It is certified that error appears in the above-identified patent and that said Letters Patent is hereby corrected as shown below:

Cover page, col. 2, under OTHER PUBLICATIONS, line 5, delete "reta" and insert -- rate --.

Col. 21, claim 27, line 1, delete "claim 23" and insert -- claim 33 --.

Col. 21, claim 28, line 1, delete "claim 23" and insert -- claim 33 --.

Signed and Sealed this  
Second Day of April, 2013

Teresa Stanek Rea  
*Acting Director of the United States Patent and Trademark Office*